US012797885B2

(12) United States Patent
Salazar et al.

(10) Patent No.: US 12,797,885 B2
(45) Date of Patent: Nov. 17, 2026

(54) FILTER SYSTEM FOR SPRAY BOOTH

(71) Applicant: GIFFIN, INC., Auburn Hills, MI (US)

(72) Inventors: Abraham J. Salazar, Lake Orion, MI (US); Erik Michon, Auburn Hills, MI (US); Sam Balasz, Bloomfield Hills, MI (US)

(73) Assignee: GIFFIN, INC., Auburn Hills, MI (US)

( * ) Notice: Subject to any disclaimer, the term of this patent is extended or adjusted under 35 U.S.C. 154(b) by 393 days.

(21) Appl. No.: 18/543,123

(22) Filed: Dec. 18, 2023

(65) Prior Publication Data

US 2024/0198373 A1 Jun. 20, 2024

Related U.S. Application Data

(60) Provisional application No. 63/579,687, filed on Aug. 30, 2023, provisional application No. 63/507,668, filed on Jun. 12, 2023, provisional application No. 63/496,729, filed on Apr. 18, 2023, provisional application No. 63/493,901, filed on Apr. 3, 2023, provisional application No. 63/387,782, filed on Dec. 16, 2022.

(51) Int. Cl.

*B05B 14/43* (2018.01)
*B01D 46/00* (2022.01)
*B05B 16/60* (2018.01)

(52) U.S. Cl.

CPC .......... *B05B 14/43* (2018.02); *B01D 46/0013* (2013.01); *B01D 46/0015* (2013.01); *B05B 16/60* (2018.02); *B01D 2201/24* (2013.01)

(58) Field of Classification Search

CPC .................................................. B01D 2271/02

See application file for complete search history.

(56) References Cited

U.S. PATENT DOCUMENTS

| | | | | |
|---|---|---|---|---|
| 4,590,884 | A * | 5/1986 | Kreeger | B05B 14/43 118/631 |
| 4,723,505 | A | 2/1988 | Wilson et al. | |
| 6,264,330 | B1 * | 7/2001 | Walton | F16M 11/08 104/243 |
| 11,235,346 | B1 | 2/2022 | Ishida et al. | |
| 2015/0367372 | A1 | 12/2015 | Roeckle et al. | |
| 2018/0207669 | A1 | 7/2018 | Zebisch et al. | |
| 2018/0243778 | A1 | 8/2018 | Covizzi et al. | |
| 2020/0179853 | A1 | 6/2020 | Wieland et al. | |

FOREIGN PATENT DOCUMENTS

DE 102018112738 A1 8/2018

* cited by examiner

*Primary Examiner* — Allen R. B. Schult

(74) *Attorney, Agent, or Firm* — DICKINSON WRIGHT PLLC

(57) ABSTRACT

A filter system adapted for use with a paint spray booth having one or more inlet ducts and one or more exhaust duct includes at least one movable cart formed with a housing having one or more surfaces for providing a housing inlet and an housing outlet, at least one filter medial element arranged within the housing and positioned between the housing inlet and the housing outlet, and at least one movable device having at least one sealing element. The at least one movable device of the filter system is connected with each of the inlet duct and the exhaust duct and configured to provide for sealing between the housing inlet and the inlet duct, and also between the housing outlet and the exhaust duct.

9 Claims, 31 Drawing Sheets

FILTER SYSTEM FOR SPRAY BOOTH

CROSS-REFERENCE TO RELATED APPLICATIONS

This application claims the benefit of priority under 35 U.S.C. § 119 to U.S. Provisional Patent Application Nos. 63/579,687, filed Aug. 30, 2023; 63/507,668, filed Jun. 12, 2023; 63/496,729, filed Apr. 18, 2023; 63/493,901, filed Apr. 3, 2023 and 63/387,782, filed Dec. 16, 2022, the contents of which are incorporated herein by reference in their entirety.

TECHNICAL FIELD

This invention relates to a filter system for a painting facility, and in particular to a dry filter system used in a spray booth for collecting uncoated (unused) paint mist contained in exhaust gas.

BACKGROUND

The statements in this section merely provide background information related to the present disclosure and may not constitute prior art.

Spray booths are used in many industrial applications for applying paint or other coatings to components or assemblies. These systems are used to create an environment for applying high-quality coatings as well as controlling the environmental emissions of solids and volatile organic compounds (VOCs). In some applications, typically those for applying paint to components using a booth which may not be as large as an automobile body paint booth, it is appropriate and convenient to use dry filters as an alternative to water wash filters to capture the oversprayed paint. For example, even within the automotive vehicle production market, spray booths used to paint smaller parts, fascias, mirror covers, etc., are potential candidates to use a dry-filter type. However, the choice of capture technology depends on the amount of overspray generated per unit time, and other factors.

In addition to simplicity and reducing initial investment, dry-filter booths have the advantage over water wash filters in that they do not add moisture to the exhaust air, therefore, in principle, reconditioning the air to allow recirculating it back to the booth may be operationally cheaper. Besides, eliminating water also eliminates the need for a water reconditioning process that takes place in a sludge tank in which paint solids are separated and disposed of. However, since dry filters typically do not remove VOCs flashing from the paint into the air, the concentration of fumes in the exhaust can be typically larger than that in water washed booths. An explanation for this is that both the water and the chemicals added to it absorb some of these VOCs. In addition, in water washing, filtration is constantly transferring paint into water. This water stays only a short period of time in contact with the air. In fact, the majority of the water is collected and removed from the booth shortly after contacting the paint and directed to a treatment process. In the dry-filter booth, the captured paint remains in the filter which continues being exposed to the air and evaporating VOCs, until it almost dries up. Therefore, the total amount of VOCs released to the air per unit mass of paint sprayed is typically larger in a dry-filter booth.

Moreover, since dry-filter booths are typically less sophisticated, their spraying process may not include robots and electrostatic charging. As a result, paint transfer efficiency is typically lower in dry-filter booths when compared to that occurring in a more sophisticated water washed booth. Lower transfer efficiency means more overspray generated per unit mass of paint sprayed. More overspray in turn means more paint to capture and more VOCs released to the air. All these reasons prevent the use of dry-filter booths in certain painting operations, for example those that use a substantial amount of paint per unit time.

Another limitation, and inconvenience, of presently available dry filter spray booths is that, as the filters load with paint, the pressure drop through the filters constantly changes, which affects not only the energy required to operate the booth but also the air distribution inside the spraying section of the booth, potentially affecting the quality of the paint job. Moreover, for a given filter type, design and configuration, a correlation exists between the filter's efficiency and how quickly it will load with paint. When the filters load excessively, it is typically mandatory to stop the painting operation to change the filters regardless of the stage of the painting process which may lead to defects and/or lost parts, therefore changing filters may be a time consuming process that adds no value to the production process, thus, it becomes a waste in productivity.

Numerous designs and systems for dry filter applications are known for use with large-scale industrial applications. For example, carts can be used for transporting dry filters, either new or laden with contaminants. In the design of such systems, it is important to enable convenient changing of filter media elements and disposal of used dry filter elements. In addition, concerns of cost, efficiency and maintenance requirements are present. For some dry filter system designs, time-consuming taping and sheeting of filter systems is necessary to provide proper air sealing and confinement of contaminant laden airflow. Also, taping is necessary to avoid paint from creeping within the space between the filters and between the filter support and the filter. If allowed, this paint may dry during booth operation which would make changing filters very difficult. Further considerations are the clearance and space requirements for implementing a particular dry filter technology. Overspray containment, whether by water wash or dry filter technologies, is generally accomplished using a dedicated volume beneath a spray booth (namely under section). Designs which require greater height under the spray booth add considerably to the initial cost of the entire installation.

SUMMARY

Dry filter concepts in accordance with the present disclosure are described in numerous embodiments. Common among the embodiments is the use of a transportation cart which moves one or more media elements into position which is sealed into an airflow system to provide filtration. For these concepts, a filter media element is oriented horizontally into the filter cart (vertical downward airflow direction). This orientation provides benefits in terms of filter performance and height of the dedicated space beneath the spray booth for capture. Additionally, it provides an enclosing cart of limited height which has sealing features and also enhances its stability during movement. Further, the present disclosure allows changing the loaded filters (i.e., contaminated filters) without touching it such that the present invention reduces exposure to the operation personnel.

In accordance with an exemplary aspect of the present disclosure, a filter system adapted for use with a paint spray booth having one or more inlet ducts for conducting a flow of contaminated air and one or more exhaust ducts for conducting a flow of filtered air includes at least one movable cart formed with a housing having one or more surfaces for providing a housing inlet and a housing outlet, at least one filter media element arranged within the housing and positioned between the housing inlet and the housing outlet, and at least one movable device having at least one sealing element, which is connected with each of the inlet duct and the exhaust duct, and configured to provide for sealing between the housing inlet and the inlet duct and also between the housing outlet and the exhaust duct.

In accordance with a further aspect of the present disclosure, the at least one movable device includes an inlet sleeve duct and an exhaust sleeve duct movably attached around a bottom of the each of the inlet duct and the exhaust duct. The at least one sealing element is attached around a perimeter of a bottom of the inlet and exhaust sleeve ducts. Further, at least one movable device includes at least one actuator having a first end fixedly attached to each of the inlet duct and the exhaust duct, and a second end fixedly attached to each of the inlet and exhaust sleeve ducts such that the at least one actuator is configured to move the inlet and exhaust sleeve ducts in a vertical direction.

In accordance with a further aspect of the present disclosure, the at least one movable device includes a blade seal having a first end securely attached to a top portion of each of the inlet and exhaust sleeve ducts and a second end pushed against each of the inlet and exhaust ducts to provide seal between the inlet duct and the inlet sleeve duct and also between the exhaust duct and the exhaust sleeve duct. The movable device further includes a deformable metal seal movably connected between the inlet duct and the inlet sleeve duct and also between the exhaust duct and the exhaust sleeve duct, and arranged next to the blade seal to provide seal and also provide support to the blade seal.

In accordance with a further aspect of the present disclosure, the inlet and exhaust sleeve ducts are each configured to move downward for making contact with the top surfaces of the housing inlet and the housing outlet to provide seal between the inlet sleeve duct and the housing inlet, and also the exhaust sleeve duct and the housing inlet.

In accordance with a further aspect of the present disclosure, the filter system is operable in two positions as a loaded position wherein the at least one movable cart is arranged in an under section before the sealing and an operating position wherein the filter system is in a sealing contact between the at least one movable cart and the inlet and exhaust ducts. The at least one movable cart includes one or more pins fixedly attached to a bottom of the movable cart and slid inside a guide rail fixedly disposed on a floor of the under section when the movable cart is pushed into the under section. In the loaded position, the at least one movable cart is positioned and releasably locked by a latch fixedly attached to a wall in the under section.

In accordance with a further aspect of the present disclosure, the at least one movable device is arranged relative to a first sealing element and a second sealing element. The first sealing element forms a seal between the at least one movable device and the inlet and exhaust ducts of the paint spray booth, and the second sealing element forms a seal between the at least one movable device and the at least one movable filter cart.

In accordance with another aspect of the present disclosure, a filter system adapted for use with a paint spray booth having an inlet duct for conducting a flow of contaminated air and an exhaust duct for conducting a flow of filtered air includes at least one movable cart formed with a housing having one or more surfaces for providing a housing inlet and a housing outlet, at least one filter media element arranged within the housing and positioned between the housing inlet and the housing outlet, an inlet hood securely attached around a bottom of the inlet duct and an outlet hood securely attached around a bottom of the exhaust duct, and at least one seal provided around a perimeter of each of the inlet hood and the outlet hood. The at least one movable cart is configured to move for making contact with the at least one seal between the housing inlet and the inlet hood, and also between the housing outlet and the outlet hood.

In accordance with a further aspect of the present disclosure, each of the inlet hood and the outlet hood includes a bottom surface angled to make contact with the at least one movable cart when the movable cart is pushed into a loaded position. Each of the inlet hood and the outlet hood includes an inlet gasket and an outlet gasket fixedly attached along the angled bottom surface of each of the inlet hood and the outlet hood.

In accordance with a further aspect of the present disclosure, the at least one movable cart includes an inlet wing fixedly attached around a perimeter of the housing inlet with an angle corresponding to the angled bottom surface of the inlet hood and an outlet wing fixedly around a perimeter of the housing outlet with an angle corresponding to the angled bottom surface of the outlet hood. When the at least one movable cart having the inlet and outlet wings is moved into a loaded position in an under section, the inlet angled wing contacts the inlet angled hood and the outlet angled wing contacts the outlet angled hood such that each of the inlet and outlet gaskets contacts a top surface of each of the inlet angled wing and the outlet angled wing. Further, the filter system includes one or more clamps fixedly attached to the inlet hood or the outlet hood to operatively engage with the at least one movable cart to provide seal in an operating position.

In accordance with a further aspect of the present disclosure, the at least one movable cart includes at least one horizontal wheel rotatably coupled to a bottom of the movable cart to be guided in a central rail fixedly disposed on a floor in an under section when the at least one movable cart is pushed into the under section.

In accordance with a further aspect of the present disclosure, each of the inlet ducts formed in the paint spray booth includes a door used to close and open each of inlet ducts such that at least one movable cart is replaced during the operation of the paint spray booth. The door is slidably moved to close and open the inlet duct by an actuator or a rack and pinion mechanism. The door is pivotably moved to close and open the inlet duct by a pivot mechanism.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1A:
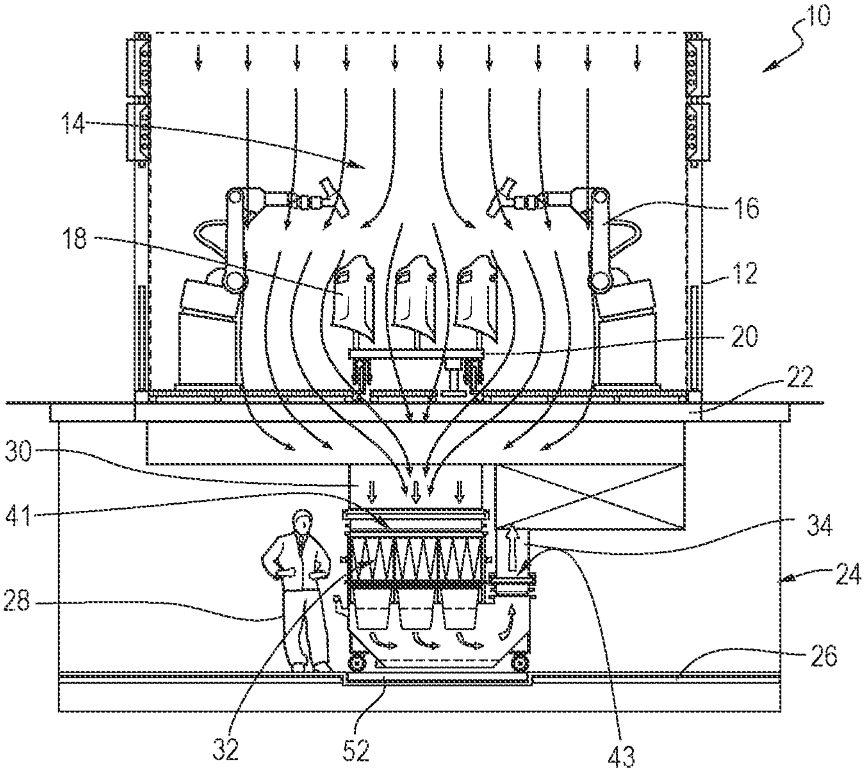
FIG. 1A is an end side view of a spray booth having a movable filter cart in accordance with an exemplary embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In accordance with an exemplary embodiment of the present disclosure, FIG. 1A shows a representative of a spray booth 10 which may be used with filter arrangements. The spray booth 10 is generally presented as background for use with all embodiments described here. As shown in FIG. 1A, the spray booth 10 includes an enclosure 12 providing a spraying bay 14. The enclosure 12 is shown in this example as having internal spray gun robots 16 for applying paint to articles 18, which is shown here as example motor vehicle front fascia panels carried by a trolley 20. The description provided herein is equally applicable where manual spray paint applications are performed. Airflow through the enclosure 12 is designated by arrows in FIG. 1A. Airflow here is presented as a downdraft configuration, but others like side draft and semi-down draft may also be implemented in accordance with other embodiments of the present disclosure.

As shown in FIG. 1A, the airflow begins traveling from the upper portion of the spraying bay 14 and across and around the articles 18. The airflow now contaminated with paint overspray travels through a floor grate 22 into an under-section 24 which includes equipment for filtering the paint laden airflow using the filtering system described in accordance with the present disclosure. The under-section 24 includes a floor 26 or is a pit as shown here providing an accommodation for a maintenance personnel (an operator) 28 for handling the filtering system (i.e., dry filter modules). The paint laden air is directed into an inlet duct 30 and passes through filter media elements 32. After passing the filter media elements 32, the airflow in this case is directed upwardly into an exhaust duct 34.

Figure 1B:
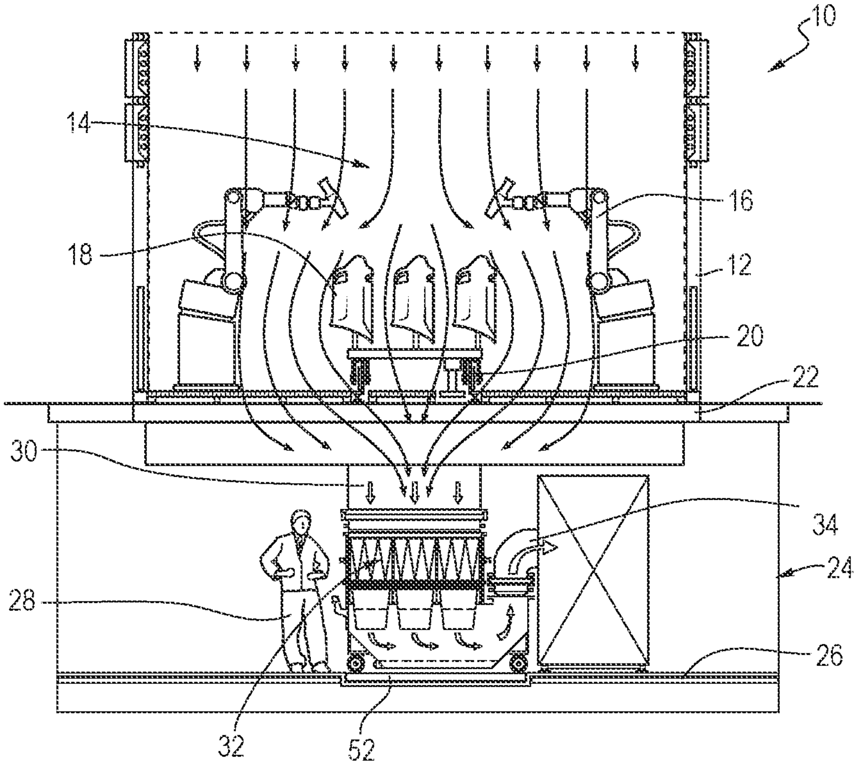
FIG. 1B shows an end side view of the spray booth having exhaust duct differently arranged in accordance with an exemplary embodiment of the present disclosure.

As shown in FIG. 1A, the airflow passing through the filter media elements 32 is directed upwardly into the exhaust duct 34, but others like a downward direction or a side direction (see FIG. 1B) can also be implemented. As shown in FIG. 1B, the exhaust duct may be fixedly attached to the floor 26 of the under-section 24 such that the airflow in passing through the filter media elements 32 is directed sideward into the exhaust duct. Further, the airflow is driven by a large fan (not shown) located in an exhaust stack coupled with the exhaust duct 34. In the following description of preferred embodiments of the present disclosure, the components of the spray booth 10 will be referenced including some variations of the system as depicted in FIG. 1A. Elements which are the same as those described previously in this and subsequent embodiments are identified by like reference numbers and a repeated description is not necessary.

Figure 2A:
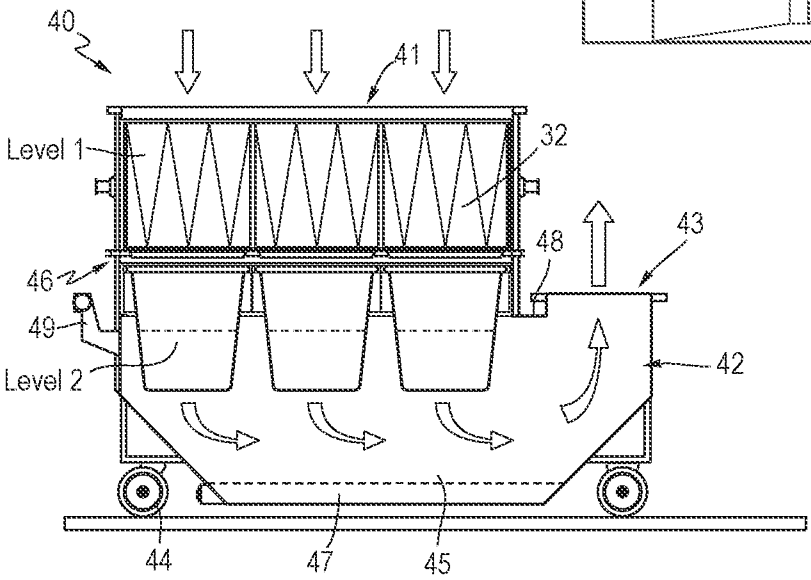
FIG. 2A is a side view of a filter cart with two level filters in accordance with an exemplary embodiment of the present disclosure.
Figure 2B:
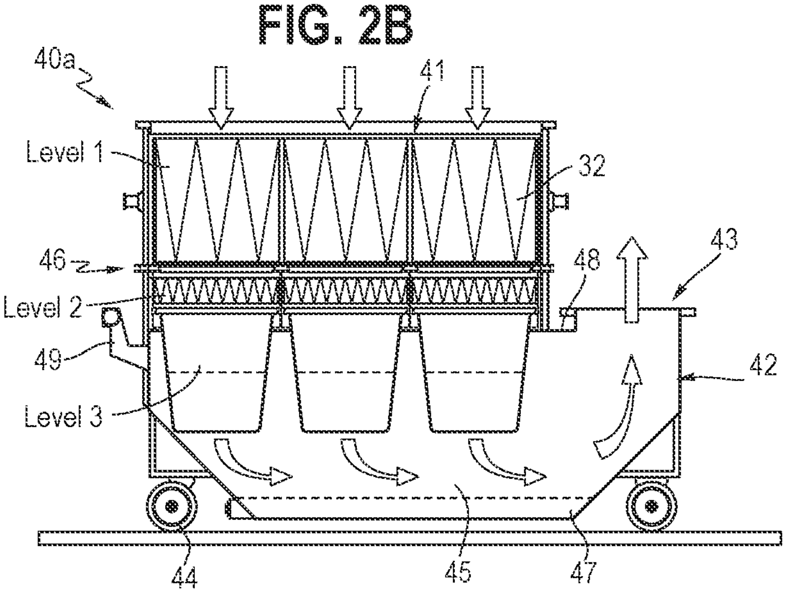
FIG. 2B is a side view of a filter cart with three level filters in accordance with an exemplary embodiment of the present disclosure.

Referring to FIG. 2A, a first embodiment of a filter cart 40 in accordance with the present disclosure is described. In FIGS. 1A-1B, the filter cart 40 is placed in the under-section 24 to filter the paint laden airflow from the spraying bay 14. As shown in FIG. 2A, the filter cart 40 is an enlarged hollow container 42, possibly formed from a sheet-metal, hard plastic, or other materials. Further, wheels 44 are shown for enabling the filter cart 40 to be conveniently moved. In this embodiment, one or more filter racks 46 are provided in the filter cart 40 for supporting the filter media elements 32. For example, in FIG. 2A, the filter media elements 32 include two different types providing two filtration levels, but in another approach, the filter medial elements 32 can include different types, providing three filtration levels (see FIG. 2B). In FIG. 2B, a filter cart 40*a* differs from the filter cart 40 in the type of the filter medial elements 32 having the first level (Level 1) providing coarse filtration with progressively finer filtration at the second level (Level 2) and the third level (Level 3) such as paper mesh filters, cardboard filters, fiber mat filters, etc.

As shown in FIGS. 1A and 2A, the filter cart 40 as a movable container is generally divided into two chambers. A first chamber formed by the filter racks 46 and a second chamber below and adjacent to the filter rack 46 formed by a hollow passage 45 for providing exhaust airflow. As shown in FIG. 2A, the filter cart 40 further includes an inlet 41 to receive the airflow exiting from the spraying bay 14 and an outlet 43 to exit the airflow through the hollow passage 45 after passing the filter media elements 32. The inlet 41 and the outlet 43 formed on the top surface of the filter cart 40 are each stepped and divided by a junction 48 providing a separation between incoming and outgoing airflow. Further, the filter cart 40 includes a handle 49 providing convenient access for movement of the filter cart 40 by the operator 28.

Figure 1C:
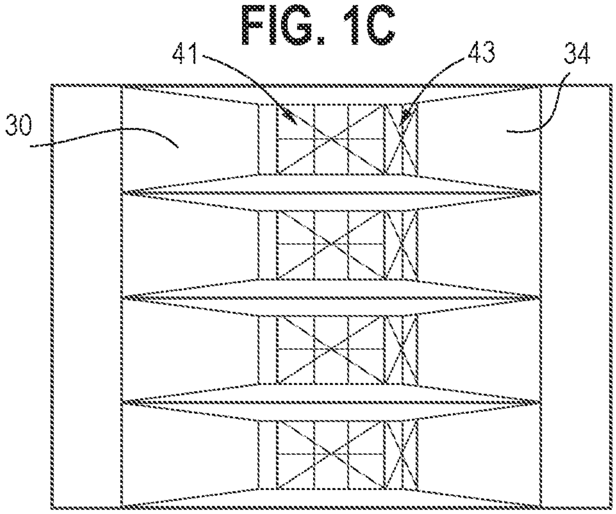
FIG. 1C is a corresponding cross-section top end view of FIG. 1A.

As shown in FIG. 1A, the contaminated air exiting through the inlet duct 30 having the under section inlet enters into a housing inlet 41 of the filter cart 40 and the filtered air passing through the filter media elements 32 exits through a housing outlet 43 to the exhaust duct 34 of the spray booth 10. Further, FIG. 1C shows a cross-sectional end top view of the filter cart 40 and exhaust ducts 34 from the floor grate 22 of the spray booth 10. As shown in an exemplary embodiment of FIGS. 1A and 1C, four filter carts 40 are arranged side by side and in operation in the paint spray booth 10.

Figure 2C:
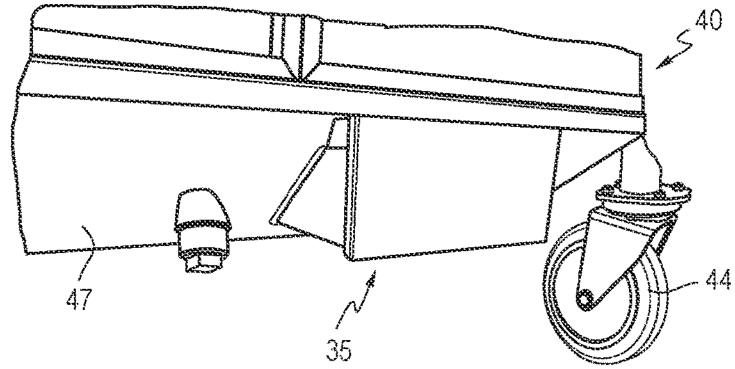
FIGS. 2C-2E show a detailed view of a drain outlet in the filter cart of FIG. 2A.
Figure 2D:
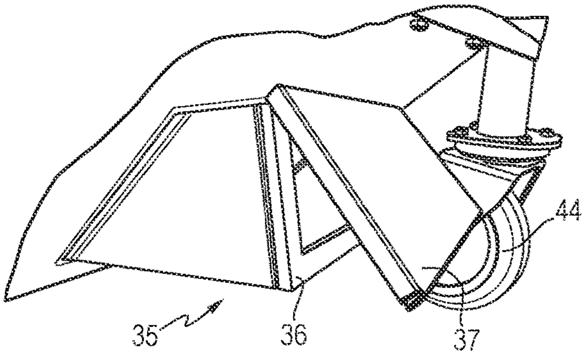
Figure 2E:
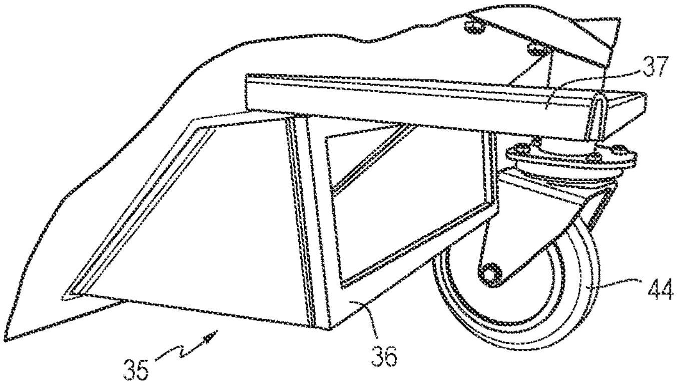

FIG. 2A also provides an illustration of airflow through the filter cart 40 as described above. Polluted (contaminated) airflow is shown entering downwardly through the top surface into the filter media elements 32 reaching the housing inlet 41. After exiting the lower portion of the filter media elements 32, the airflow is directed into a lower chamber (hollow passage) 45 where it changes direction and moves upwardly into the housing outlet 43 and upwardly across top surface that is connected to the booth's exhaust duct 34 (shown in FIG. 1A). In some instances, accumulated paint or spray may form droplets which will fall into a collection bin 47 arranged (or removably attached) at the bottom of the filter cart 40 where it can be collected and then drained or disposed of. As shown in FIGS. 2C-2E, a drain outlet 35 is located at a side of the collection bin 47 to be accessed for cleaning and inspection purposes when the filter carts are removed. Further, the collection bin 47 includes the drain outlet 35 to facilitate cleaning the collection bin 47. For example, the drain outlet 35 includes a seal 36 fixedly attached around the perimeter of the drain outlet, and a cover member 37 closed to make contact with the seal 36 to provide seal and also opened for cleaning the collection bin 47. In case of fire, the sprinkler system in the spray booth could be triggered generating a deluge of water such that the drain outlet 35 is also designed to handle the increased water flow. The filter media elements 32 can be easily removed from the filter rack 46 for replacement when they become fouled from collecting overspray. The units are replaced as needed with fresh filter media elements 32.

FIG. 2B shows a second exemplary embodiment of a filter cart 40*a* in accordance with the present disclosure. The filter cart 40*a* differs from the filter cart 40 in the type of filter media elements 32 used. In the filter rack 46 of the filter cart 40*a*, the filter cart 40*a* has one more filtration level such that the filter cart 40*a* has three (3) filtration levels. In other aspects, the filter cart 40*a* operates like the filter cart 40. The decision regarding which filter arrangement to use in the cart depends on the paint characteristics, the filtration capacity, the performance of the filters, the painting process, the user preference, the filter availability, etc.

Figure 3A:
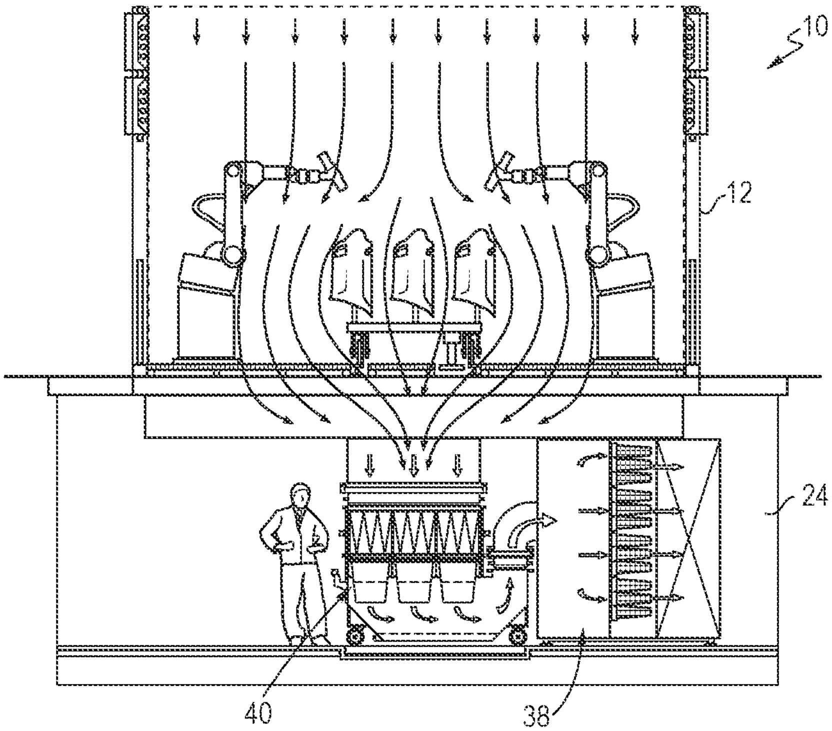
FIG. 3A is an end side view of a spray booth having a fixed filter house structure in accordance with an exemplary embodiment of the present disclosure.

FIG. 3A shows filtration occurring both at the filter cart 40 and a fixed post-filtration house. In certain paint operations, depending on the over spray droplet size distribution generated, it may be convenient, and some times more cost effective, to provide several levels of coarse inexpensive sacrificial filtration at the filter cart 40 and supplement it with fine highly effective filtration, which is typically more expensive. As shown in FIG. 3A, the fine filtration is provided by fine filters placed inside the fixed filter house structure 38. To extend the life of the fine expensive filters, the filter cart 40 is replaced relatively more often. The end result is tightly filtrated exhaust airflow within a typically reduced expense. It is understood that the system would be designed so that the expensive fine filters provided in the fixed filter housing structure 38 would be changed only occasionally while the inexpensive coarse filters provided in the filter cart 40 would be changed relatively more frequently.

Figure 3B:
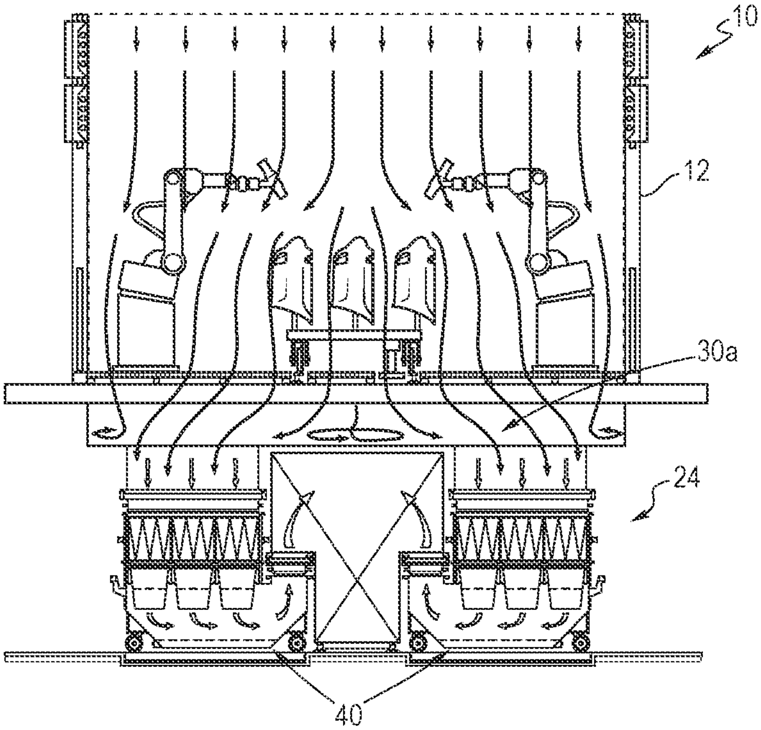
FIG. 3B is an end side view of a spray booth having a pair of filter carts 40 symmetrically arranged in the under section in accordance with an exemplary embodiment of the present disclosure.

FIG. 3B shows a pair of filter carts 40 are symmetrically arranged in the under-section 24. The inlet hoods 30*a* having the under section inlet is modified to accommodate two of the filter carts. In this case, the filter carts 40 are positioned for filtration from two sides. In another approach, they can be loaded in a serial manner from one side (not shown). In this case, separated inlet ducts 30*a* are provided. Further, this spray booth 10 is generally symmetrical about a vertical through the spraying bay 14. The embodiment of FIG. 3B is generally intended for use in high booth airflow applications and/or where high overspray generation is expected.

Figure 4A:
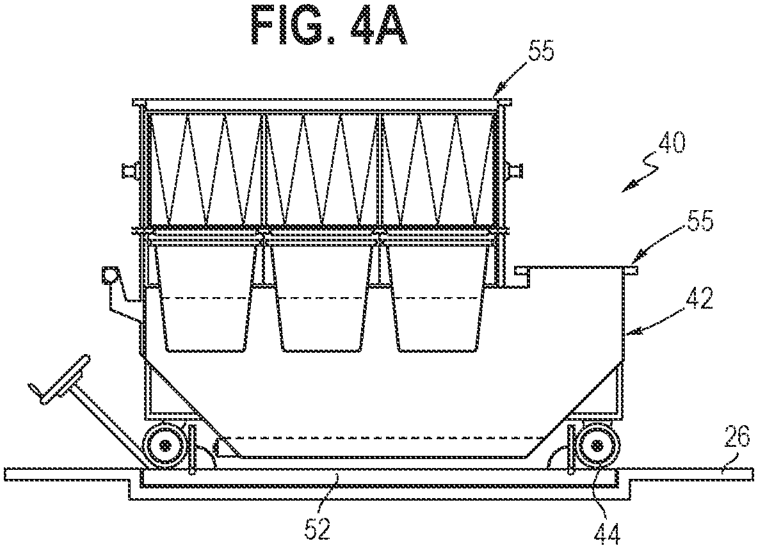
FIG. 4A is a side view of a filter cart with a platform lift in an under section.
Figure 4B:
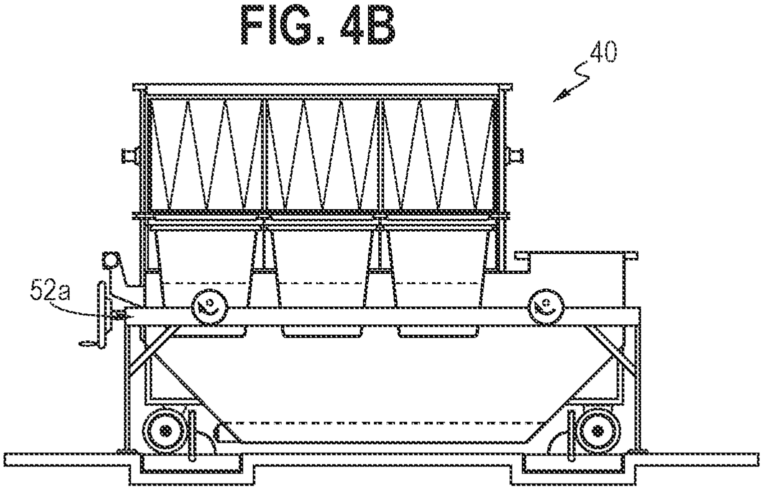
FIG. 4B is a side view of a filter cart with a cam lift.
Figure 4C:
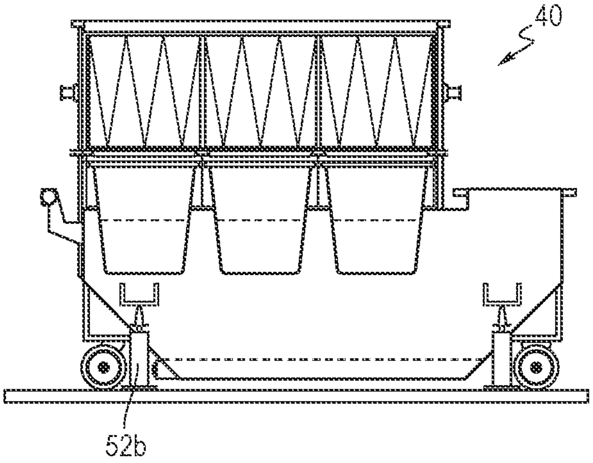
FIG. 4C is a side view of a filter cart with an actuator lift.
Figure 4D:
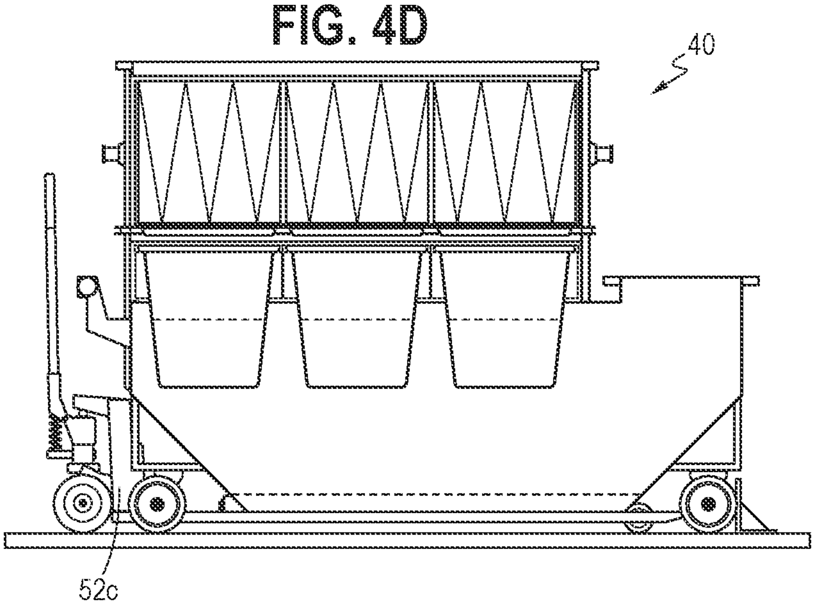
FIG. 4D is a side view of filter cart with a palette-jack lift.

Referring back to FIGS. 1A and 2A, the filter cart 40 is shown in operation with the spray booth 10 such that the filter cart 40 is located in under section 24 below the spray booth 10. The operator 28 positions the filter cart 40 in a loaded position over a platform lift 52 operatively positioned in the floor 26 of the under section 24. Once positioned, as shown in FIG. 4A, locks (not shown) are operated to hold the cart 40 at the loaded position as one of locking systems described below, then substantially the platform lift 52 is actuated to raise the filter cart 40 such that seals make contact with the inlet duct 30 defined as an under-section inlet and the exhaust duct 34 defined as an under-section outlet respectively, which is defined as an operable position of the movable cart. As shown in FIG. 2A, the filter cart 40 includes a generally horizontal top edges (i.e., upper surface 55) of the housing inlet 41 and outlet 43 having the perimeter seals. For example, the seals may be an adhesive material or an inflatable seal type, which is described below. This provides sealing and isolation for the airflows entering and exiting from the filter cart 40.

Figure 4E:
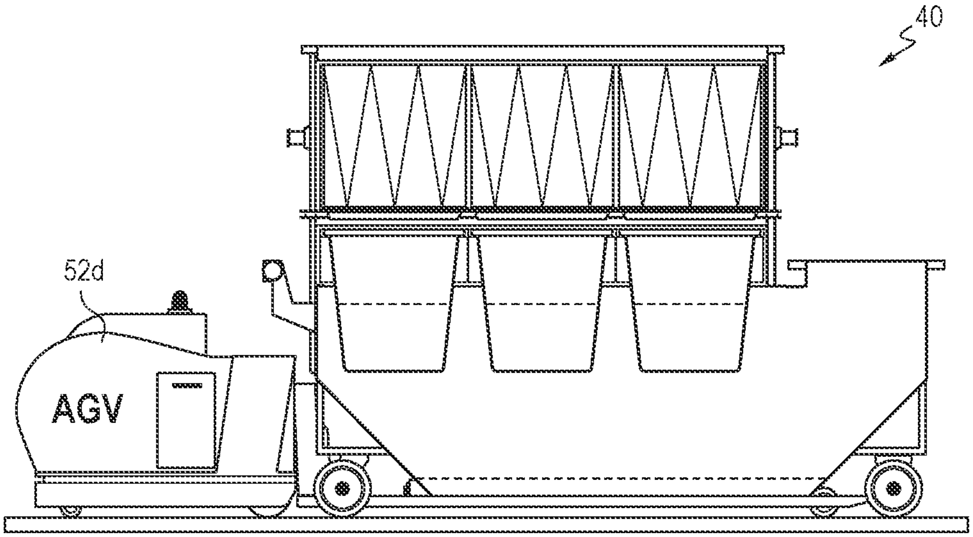
FIG. 4E is a side view of a filter cart with an Automated Guided Vehicle (AGV) lift.

In another approach, the filter cart 40 can be raised by different lifting mechanisms such as a cam lift 52*a* (see FIG. 4B) using a cam mechanism, an actuator lift 52*b* (see FIG. 4C) using a hydraulic jack, a palette-jack lift 52*c* (see FIG. 4D), and an Automated Guided Vehicle (AGV) lift 52*d* (see FIG. 4E). As shown in FIGS. 4A-4E, the lifting mechanisms are directly coupled to the housing such that the filter cart 40 is raised for sealing by itself and moved in the operating position from the loaded position in the under section 24.

Figure 5A:
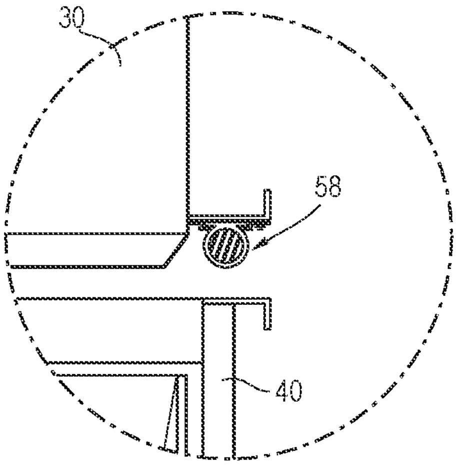
FIG. 5A shows a gasket seal formed around a duct before making contact between a filter cart and the duct.
Figure 5B:
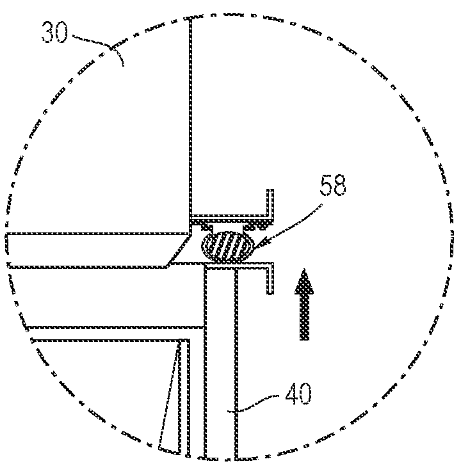
FIG. 5B shows the gasket seal when the movable cart contacts the gasket seal.
Figure 6A:
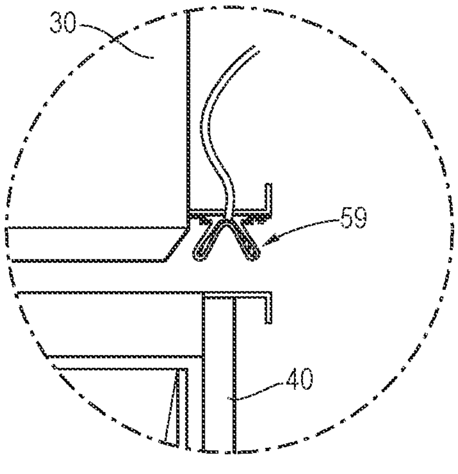
FIG. 6A shows an inflatable seal formed around a duct before making contact between a filter cart and the duct.
Figure 6B:
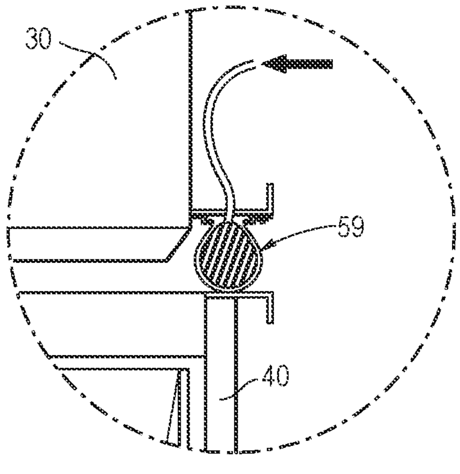
FIG. 6B shows the inflatable seal when the inflatable seal is inflated to make contact with the filter cart.

FIGS. 5A-6B show other sealing mechanisms such as a gasket or an inflatable gasket between the inlet and exhaust ducts 30 and 34 and the filter cart 40. FIGS. 5A-5B show a gasket seal 58 formed around the perimeter of the inlet duct 30. The gasket seal 58 is also formed around the perimeter of the exhaust duct 34 (See FIG. 7). The gasket seal 58 is in a ring-shaped piece of rubber to seal the junction between the filter cart 40 and the inlet and exhaust ducts 30 and 34 by lifting the filter cart 40. FIGS. 6A-6B show an inflatable seal 59 formed around the perimeter of the inlet duct 30 to provide the seal between the filter cart 40 and the inlet duct 30 by supplying air to inflate the inflatable seal 59 instead of lifting up the filter cart 40. The inflatable seal 59 is also formed around the perimeter of the exhaust duct 34 (not shown).

Figure 7:
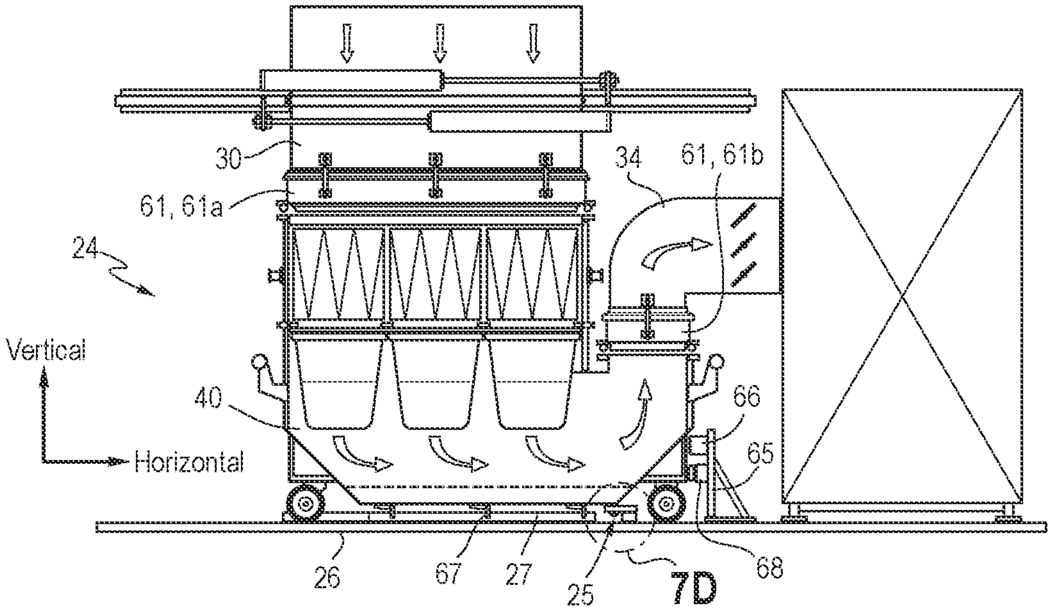
FIG. 7 is a side end view of a filter cart having an sleeve duct system for sealing in an under section in accordance with an exemplary embodiment of the present disclosure.

FIG. 7 illustrates another embodiment of the present disclosure, which shows different features in the under section 24 of the spray booth 10, compared to the first embodiment of FIG. 1A. In FIG. 7, for example, the under section 24 includes a sleeve duct system for providing seal between the filter cart 40 and the inlet and exhaust ducts 30 and 34 which moves the sleeve duct system downwardly, along the inlet duct 30 of the spray booth 10 (i.e., a vertical direction) against which a first sliding seal is created, and towards the cart 40 to create a second seal around the periphery of the sleeve duct 61. As shown in FIG. 7, the sleeve duct system includes a sleeve duct 61 securely attached to around the perimeter of each of the inlet duct 30 (i.e., under section inlet) and the exhaust duct 34 (i.e., under section outlet) and the gasket seals 58 attached around the perimeter of the sleeve duct 61 (i.e., the second seal) to prevent contaminated air leakage in the junction between the inlet and outlet ducts and the filter carts.

Figure 7A:
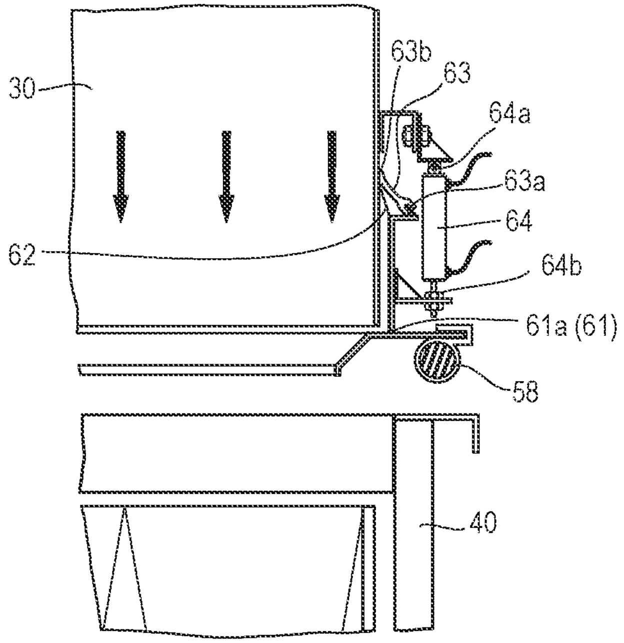
FIG. 7A shows a detailed view of the sleeve duct system of FIG. 7.

FIG. 7A shows a detailed view of the sleeve duct system having the gasket seal 58, the sleeve ducts 61 (an inlet sleeve duct 61*a* and an exhaust sleeve duct 61*b*), a metal seal 62, a blade seal 63, and a dual-action piston actuator 64. The sleeve duct system is generally attached to the main inlet duct 30 and/or the exhaust duct 34 and disposed between the inlet duct 30 (and/or the exhaust duct 34) and the filter cart 40 to provide the seal. For example, FIG. 7A shows the inlet sleeve duct 61*a* attached around the perimeter of the inlet duct 30. As shown in FIG. 7A, the inlet sleeve duct 61*a* attached to the inlet duct 30 slides down to push the gasket 58 attached to the inlet sleeve duct 61*a* onto the filter cart 40 to provide seal. The inlet sleeve duct 61*a* is lifted up and down onto the filter cart 40 by the actuation of the dual-action piston actuator 64, which has a first end 64*a* attached to the inlet duct 30 and a second end 64*b* attached to the inlet sleeve duct 61*a*. Further, as shown in FIG. 7A, the seal between the inlet duct 30 and the inlet sleeve duct 61*a* is provided by both seals such as the deformable metal seal 62 and the blade seal 63. The blade seal 63 has a first end 63*a* fixedly attached around a top portion of the inlet sleeve duct 61*a* and a second end 63*b* pushed against a side surface of the inlet duct 30 to enhance the seal action. The deformable metal seal 62 is movably connected between the sleeve ducts and the ducts. Further, the blade seal 63 is mostly protected from direct exposure to paint and/or other chemicals by arranging the metal seal 62 next to the blade seal 63 (i.e., between the side surface of the inlet duct 30 and the blade seal 63) such that the metal seal 62 is directly exposed to the paint and/or other chemicals during the operation and is to provide support to the flexible blade seal 63.

Figure 7B:
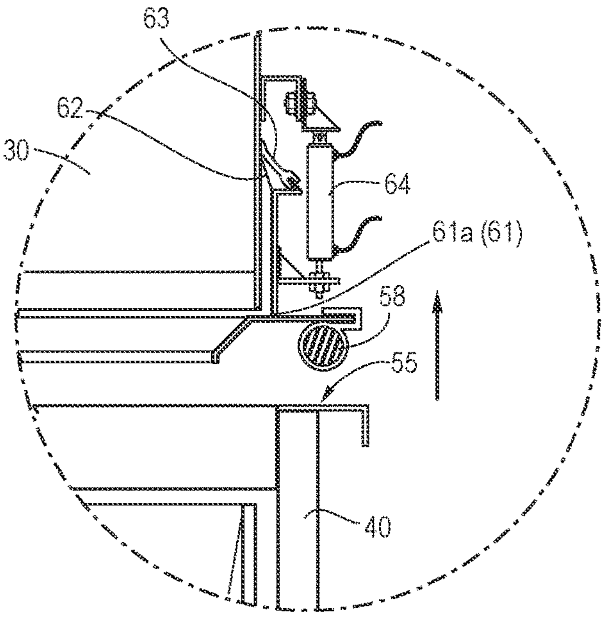
FIG. 7B shows a detailed view of the sleeve duct system with a move-up position of FIG. 7.
Figure 7C:
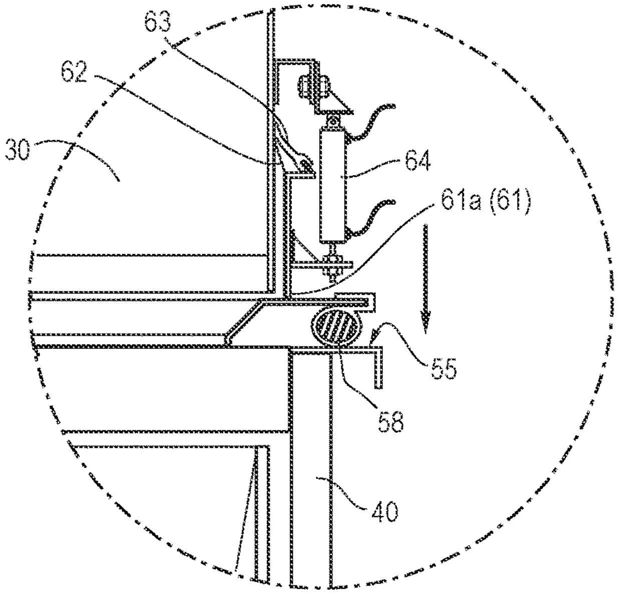
FIG. 7C shows a detailed view of the sleeve duct system with a move-down position of FIG. 7.

FIG. 7B shows a receded position (Slide-Up) of the sleeve duct 61 (i.e., inlet and exhaust sleeve ducts 61*a* and 61*b*) and FIG. 7C shows an extended position (Slide-Down) of the sleeve duct 61 (i.e., inlet and exhaust sleeve ducts 61*a* and 61*b*). In the receded position of FIG. 7B, compressed air contracts the two-way piston actuator 64 to lift up the sleeve duct 61 disengaging the gasket seal 58 from the upper surface 55 of the filter cart 40. In the extended position of FIG. 7C, compressed air extends the two-way piston actuator 64 to lower the sleeve duct engaging the gasket seal 58 onto the upper surface 55 of the filter cart 40. As shown in FIG. 7, accordingly, the sleeve duct system provides the seal between the inlet duct 30 and the filter cart 40, and also between the exhaust duct 34 and the filter cart 40 by moving the sleeve duct 61 in a vertical direction (i.e., up/down direction).

Figure 7D:
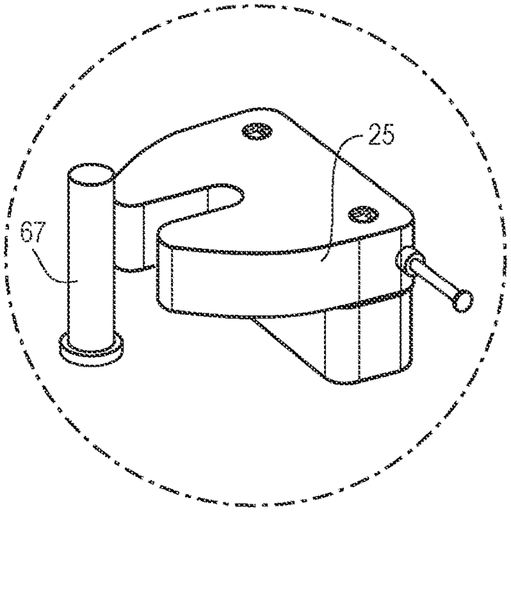
FIG. 7D shows a detailed view of a latch system in the under section.

Referring back to FIG. 7, the filter cart 40 is pushed horizontally against a wall 65 with a bumper 66 attached to the wall 65, which is arranged in the under section 24 of the spray booth 10. As shown in FIG. 7, one or more pins 67 are fixedly attached to the bottom of the filter cart 40 and a guide rail 27 is fixedly attached to the floor 26 in the under section 24 such that the filter cart 40 is guided to position in the under section 24 by the one or more pins 67 sliding along the guide rail 27 in a horizontal position. Further, a latch 25 (see also FIG. 7D) is fixedly attached on the floor 26 of the under section 24 such that, when one of the pins 67 contacts the latch 25, which securely and releasably engages one of the pins 67 to hold the filter cart 40 in a loaded position where the filter cart 40 is arranged in the under section 24. Further, the wall 65 includes a switch 68 configured to operate the two-way position actuators 64 of the sleeve duct system to provide seal defined as an operating position of the filter cart 40. As shown in FIG. 7, the bumper 66 prevents the filter cart 40 from damaging the pin & latch system and the switch when the filter cart 40 is pushed into the loaded position.

Figure 8:
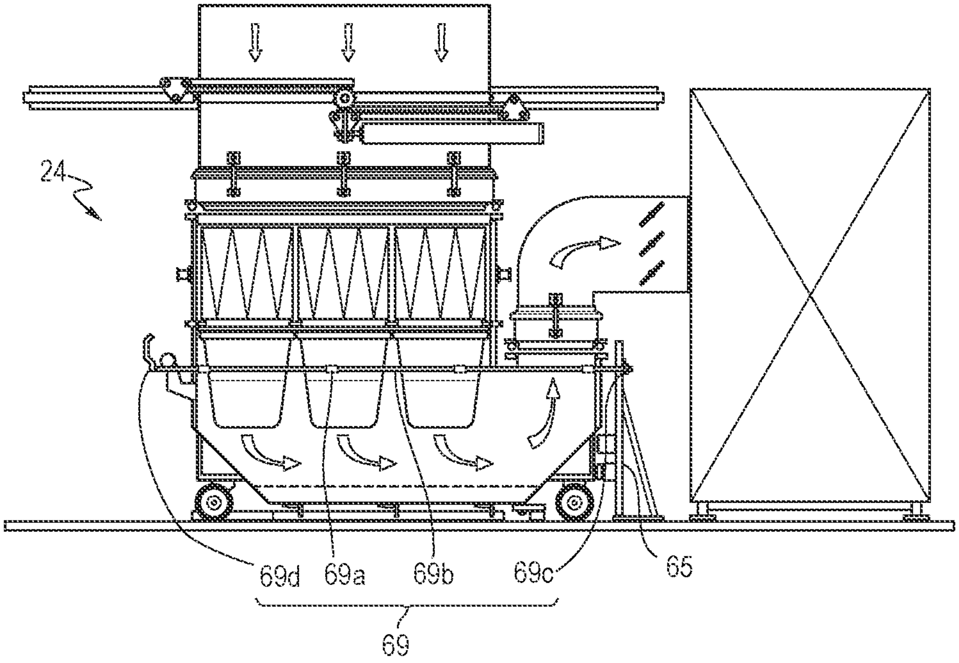
FIG. 8 is a side end view of a filter cart having a rotating latch and handle system in accordance with an exemplary embodiment of the present disclosure.
Figure 8A:
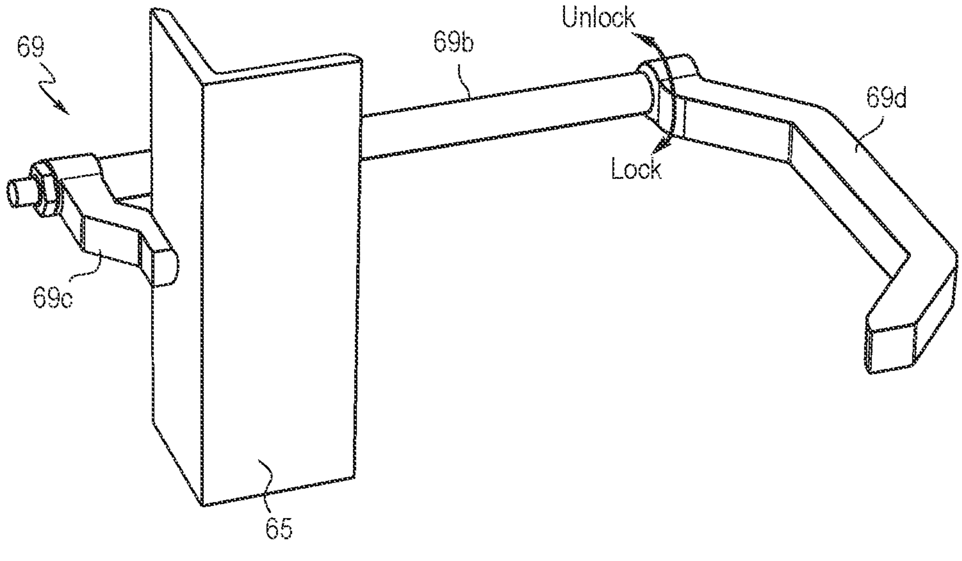
FIG. 8A shows a detailed view of the rotating latch and handle system of FIG. 8.

FIGS. 8 and 8A show another embodiment, which is similar to the embodiment of FIG. 7 described above, but shows the rotating latch and handle system 69 to hold the filter cart 40 against the gasket seal 58 to provide a seal around the periphery of the cart. The rotating latch and handle system 69 can be used in combination with the bumper 66 to hold the filter cart 40 in the loaded position. As shown in FIGS. 8 and 8A, the rotating latch and handle system 69 includes one or more bushings 69*a* attached to a side surface of the filter cart 40, an axial bar 69*b* rotatably coupled with the bushings 69*a*, and the rotating latch 69*c* attached to an end of the axial bar 69*b* opposite end from the handle 69*d*. When the filter cart 40 is horizontally pushed into the loaded position in the under section 24, the rotating latch 69*c* is securely and manually coupled with the wall 65 to hold the filter cart 40 in the loaded position.

Figure 9A:
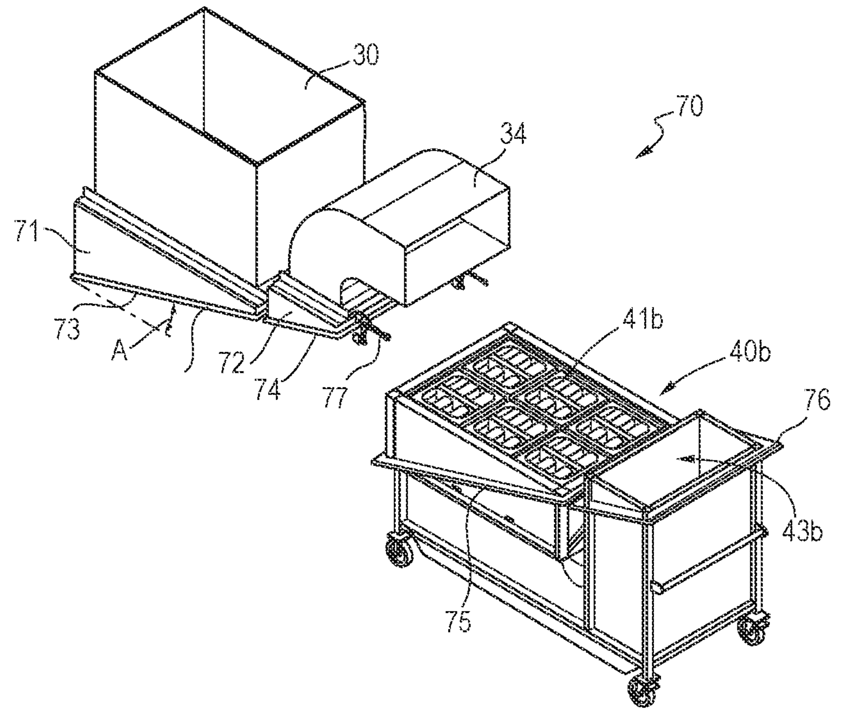
FIG. 9A is a perspective top view of a filter cart with a wedge sealing system in an under section in accordance with an exemplary embodiment of the present disclosure.
Figure 9B:
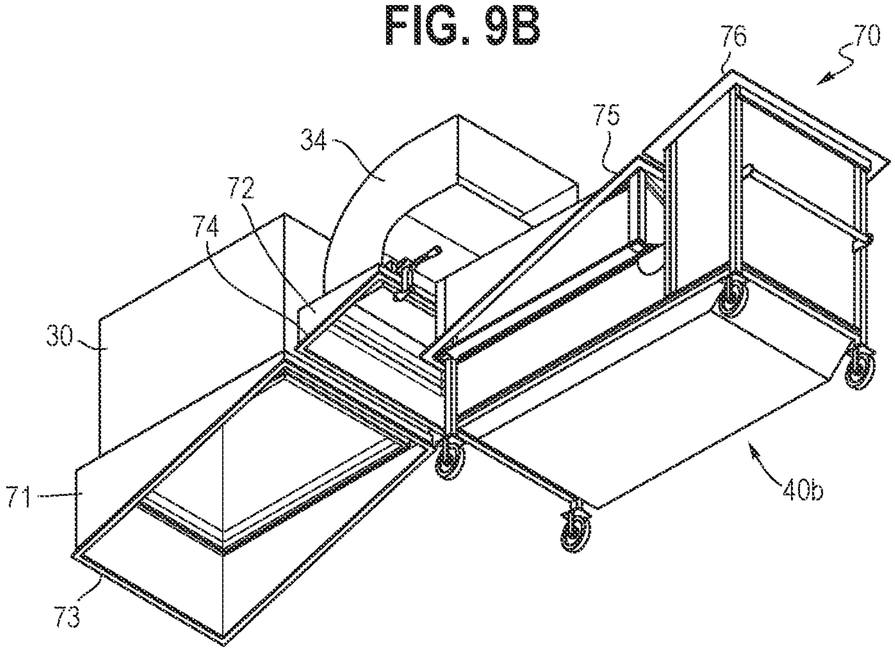
FIG. 9B is a perspective bottom view of the filter cart with the wedge sealing system of FIG. 9A.
Figure 9C:
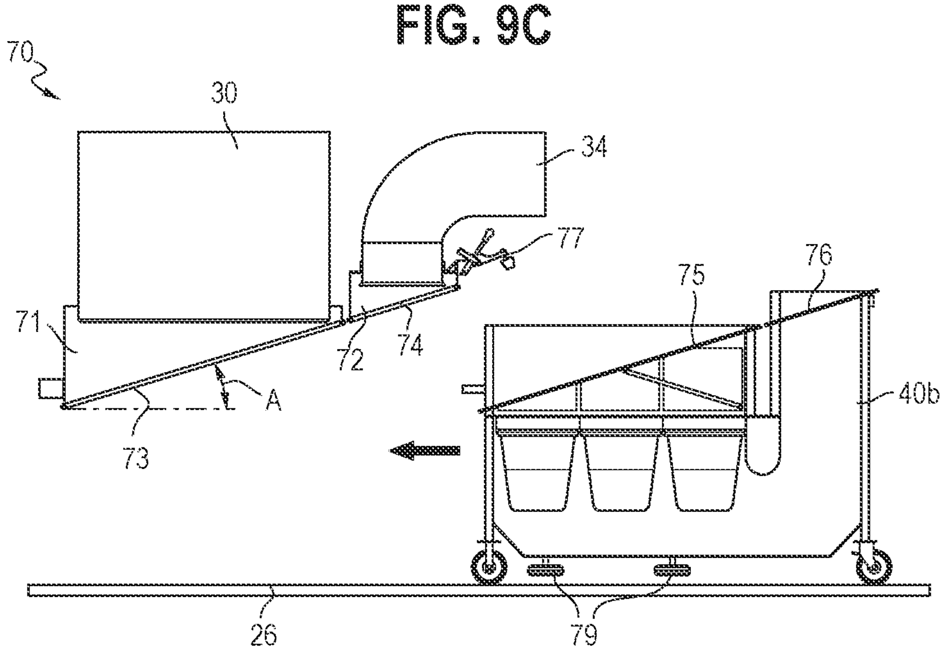
FIG. 9C is a side end view of the filter cart with the wedge sealing system in a disengaged position of FIG. 9A.
Figure 9D:
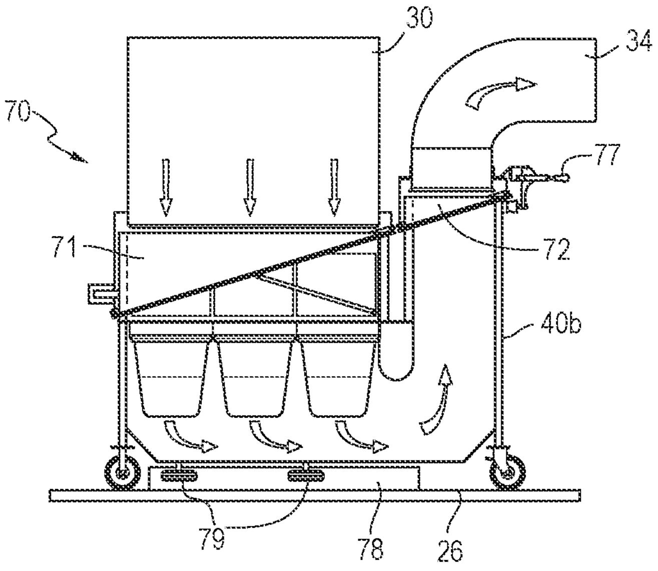
FIG. 9D is a side end view of the filter cart with the wedge sealing system in an engaged position of FIG. 9A.

FIGS. 9A-9D show another embodiment of the present disclosure for providing a wedge sealing system 70. FIG. 9A shows a perspective top view of the wedge sealing system 70 with a filter cart 40*b* in a disengaged position, FIG. 9B shows a perspective bottom view of FIG. 9A, FIG. 9C shows a side view of FIG. 9A, and FIG. 9D shows another side view of FIG. 9A in an engaged position of the filter cart 40*b*. The embodiment of FIG. 9A is generally similar to the embodiment of FIG. 1A described above, but shows the wedge sealing system 70 to provide seal between the ducts (inlet duct 30 and exhaust duct 34) and the filter cart 40*b*. As shown in FIGS. 9A and 9C, the wedge sealing system 70 includes an inlet hood 71 formed with an angled-cut at a bottom portion of the inlet hood 71 and securely attached to the bottom of the inlet duct 30 at a top portion of the inlet hood 71, and an outlet hood 72 also formed with an angled-cut at a bottom portion of the outlet hood 72 and securely attached to the bottom of the exhaust duct 34 at a top location of the outlet hood 72. The angled bottom surfaces of the inlet and outlet hoods 71 and 72 are generally and substantially aligned to each other along a cut angle A (see FIG. 9C). The cut angle A is preferably in the range of 10-45 degrees, and preferably about 25-35 degrees.

In FIGS. 9A and 9C, the wedge sealing system 70 further includes an inlet gasket 73 securely attached around the perimeter of the angled bottom of the inlet hood 71, and also an outlet gasket 74 securely attached around the perimeter of the angled bottom of the outlet hood 72. Further, the filter cart 40*b* includes an inlet wing 75, which securely attached around the perimeter of the housing inlet 41*b* with the cut angle A corresponding to the angled bottom surface of the inlet hood 71 and an outlet wing 76 securely attached around the perimeter of the housing outlet 43*b* with the cut angle A corresponding to the angled bottom surface of the outlet hood 72. Accordingly, when the filter cart 40*b* is pushed into the under section 24, the filter cart 40*b* is wheeled into a position where the inlet and outlet gaskets 73 and 74 at the angled bottom surfaces of inlet and outlet hoods 71 and 72 contact the surface of the inlet and outlet wings 75 and 76 angled and securely attached to the filter cart 40*b*, (i.e., a loaded position of the filter cart 40*b*). After that, the filter cart 40*b* and the inlet and outlet hoods 71 and 72 are engaged by a clamp 77 attached to the inlet hood 71 or the outlet hood 72 to provide seal (for example, a gasket seal, etc.) between the inlet and outlet ducts 30 and 34 and the housing inlet and outlet 41*b* and 43*b* of the filter cart 40*b*, which is defined as an engaged position of the filter cart 40*b* (i.e., an operation position). Alternatively, the horizontal position of the cart 40*b* can be maintained through a blocking mechanism attached or incorporated in the floor 26 or other base structure. In this way, the horizontal positioning of the cart 40*b* effectuates the seal to the hood 71 and duct system 30. An adjustment mechanism such as a linear actuator can also be incorporated into the clamp 77 or blocking mechanism in the floor 26 to adjust the sealing pressure.

FIG. 9D shows the engaged position of the filter cart 40*b* as described above. When the filter cart 40*b* is pushed into the loaded position, for example, the clamp 77 attached to the outlet hood 72 is configured to allow the filter cart 40*b* to get into the engaged position (i.e., an operating position). As shown in FIG. 9D, the filter cart 40*b* is guided into the loaded position along a central rail 78 fixed to the floor 26 of the under section 24. Further, the filter cart 40*b* includes at least two rotating horizontal wheels 79 are rotationally attached to the bottom of the filter cart 40*b* such that, when the filter cart 40*b* is pushed into the under section 24 in the horizontal direction, the filter cart 40*b* can be moved into the loaded position along the central rail 78 guiding the horizontal rotating wheels 79 of the filter cart 40*b*.

Figure 10:
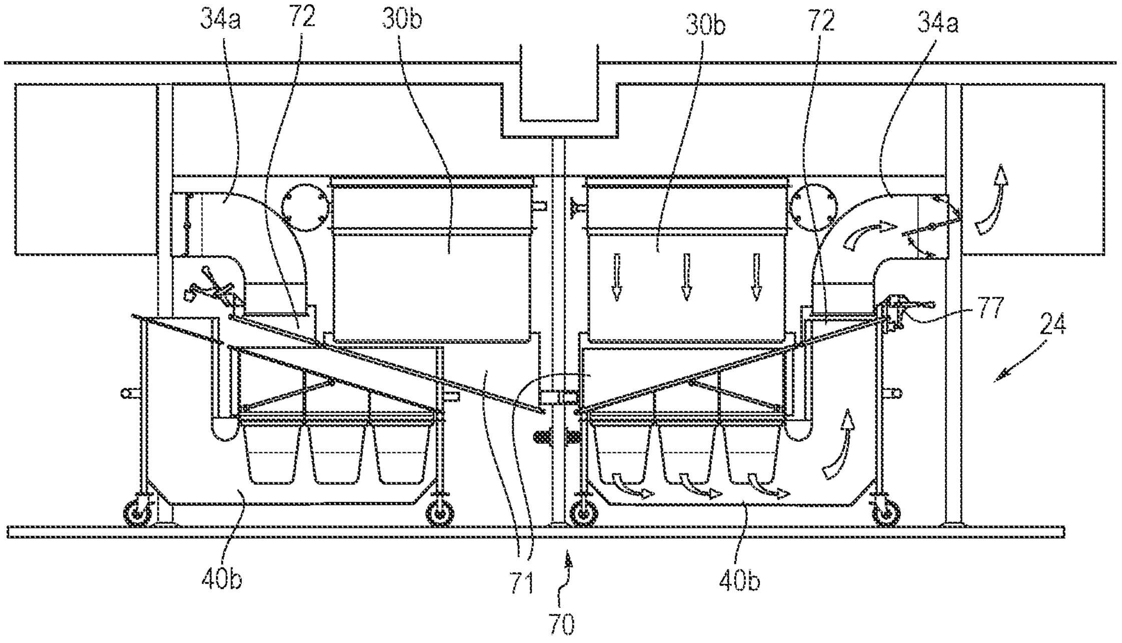
FIG. 10 is a side end view of a pair of filter carts with a wedge sealing system, which are symmetrically arranged in an under section of FIG. 9C.

FIG. 10 shows the wedge sealing system 70 with a pair of filter carts 40*b*, which are symmetrically arranged in the under section in accordance with another embodiment of the present disclosure. The inlet ducts 30*b* having the under section inlet is modified to accommodate two of the filter carts 40*b* in the under section 40*b*. The filter carts 40*b* are positioned for filtration from two sides or they can be loaded in a serial manner from one side of the under section (not shown). As shown in FIG. 10, the spray booth 10 is generally symmetrical about a vertical plane through spraying bay. In the under section 24, the inlet ducts 30*b* are each located in the center location (i.e., an inner location) of the under section 24 and the exhaust ducts 34*a* are each located at the outer location of the under section 24. This embodiment shown in FIG. 10 is generally intended for use in high booth airflow applications and/or where high overspray generation is expected.

Figure 11A:
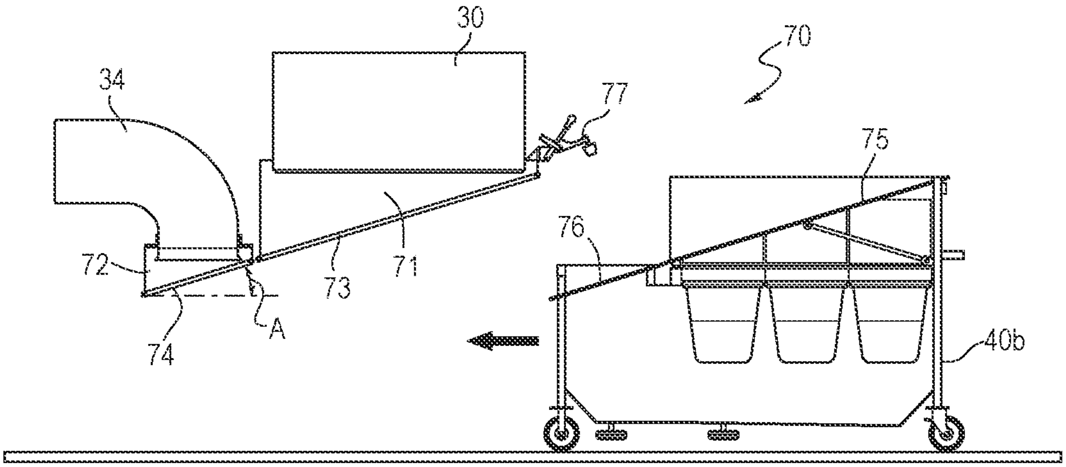
FIG. 11A is a side end view of the filter cart with a wedge sealing system in a disengaged position in accordance with an exemplary embodiment of the present disclosure.
Figure 11B:
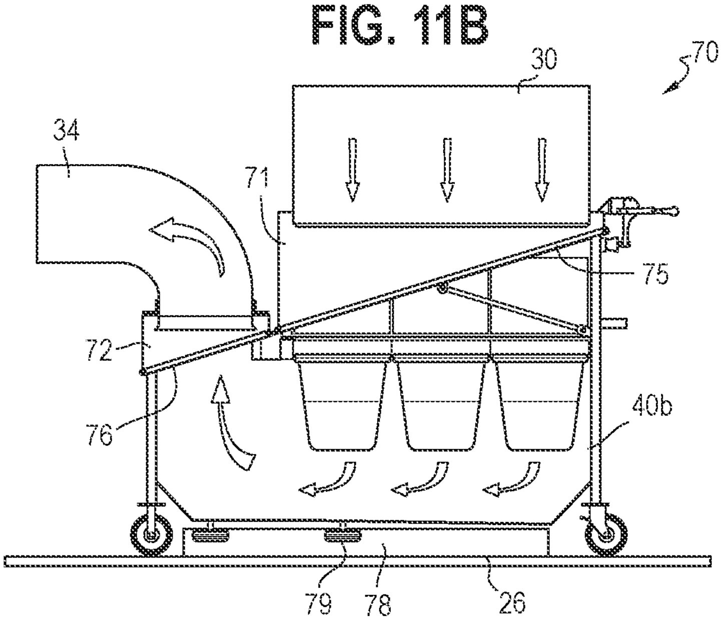
FIG. 11B is a side end view of the filter cart with the wedge sealing system in an engaged position of FIG. 11A.

FIGS. 11A-11B show another embodiment of the spray booth 10 having the wedge sealing system 70. The embodiment of FIGS. 11A-11B is similar to the embodiment of FIGS. 10A-10D described above, but the locations of the inlet duct 30 and the exhaust duct 34 are switched to each other. As shown in FIGS. 11A-11B, the inlet duct 30 is arranged near an outer side (entering side) of the filter cart 40*b* in the under section 24 and the exhaust duct 34 is arranged at an inner side (i.e., an opposite side from the outer (entering) side) in the under section 24. Further, the clamp 77 is operationally attached to the inlet hood 71 which is securely attached to the bottom of the inlet duct 30 to allow the filter cart 40*b* to get into a loaded position of the filter cart 40*b*. Further, FIG. 11A shows the disengaged position of the filter cart 40*b* in the under section 24 and FIG. 11B shows the engaged position (operating position) of the filter cart 40*b* in the under section 24.

Figure 12:
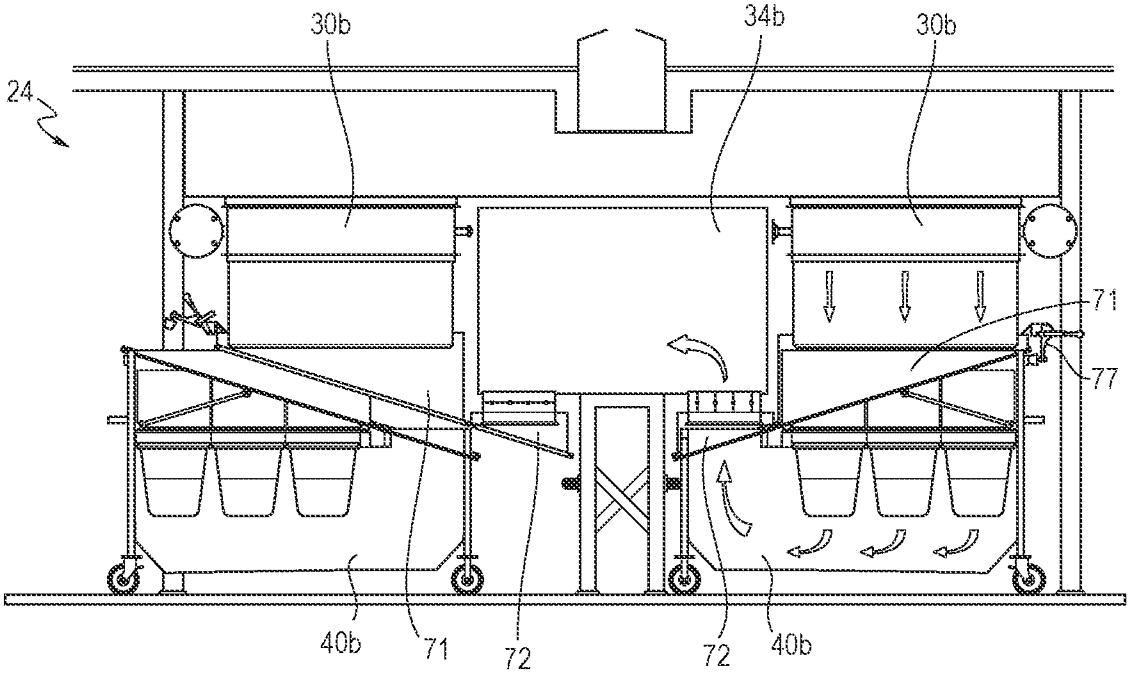
FIG. 12 is a side end view of a pair of filter carts with a wedge sealing system, which are symmetrically arranged in an under section of FIG. 11A.

FIG. 12 shows a pair of filter carts 40*b*, which are symmetrically arranged in the under section in accordance with the present disclosure. The embodiment of FIG. 12 is similar to the embodiment of FIGS. 11A-11B described above, but shows the pair of filter carts 40*b*. In FIG. 12, two inlet ducts 30*b* having the under section inlet are arranged at the outer (entering) side in the under section 24, and the exhaust duct 34*b* is modified to accommodate two of the filter carts 40*b* in the center location of the under section 24. As shown in FIG. 12, the filter carts 40*b* are positioned for filtration from two sides or they can be loaded in a serial manner from one side of the under section 24 (not shown). In the under section 24, the inlet ducts 30*b* are each arranged at the entering location of the filter carts 40*b* (i.e., the outer side of the under section 24) and the exhaust ducts 34*b* are each arranged at the inner location (i.e., center location) of the under section 24. This embodiment shown in FIG. 12 is generally intended for use in high booth airflow applications and/or where high overspray generation is expected.

Figure 13A:
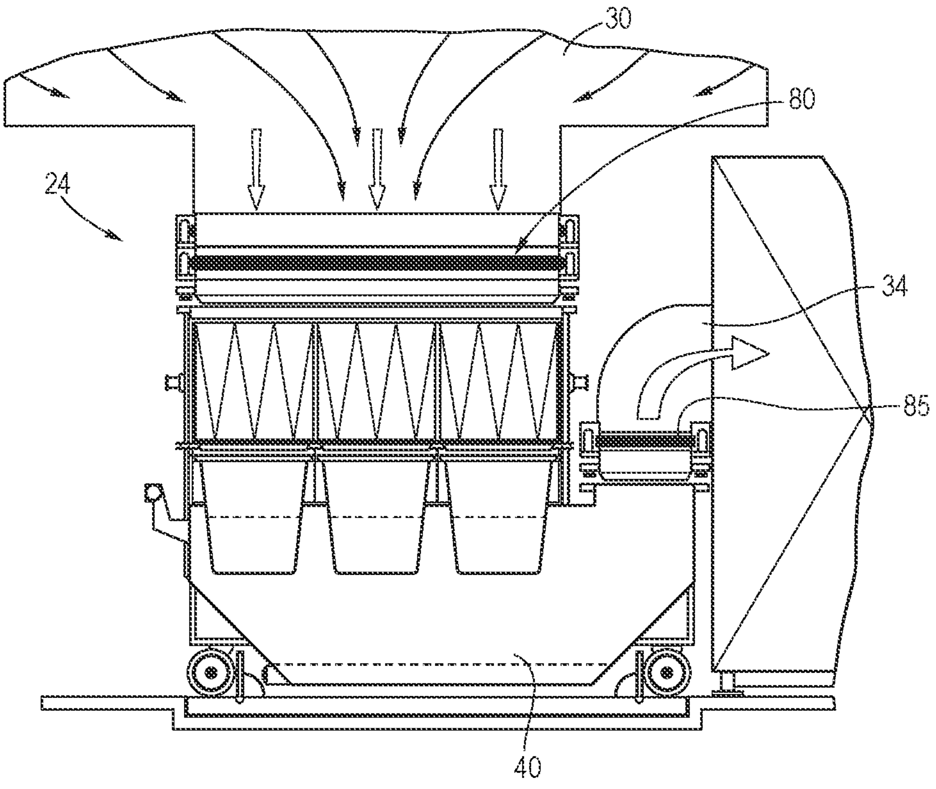
FIG. 13A is a side end view of an inlet duct having an inlet door in an under section in accordance with an exemplary embodiment of the present disclosure.
Figure 13B:
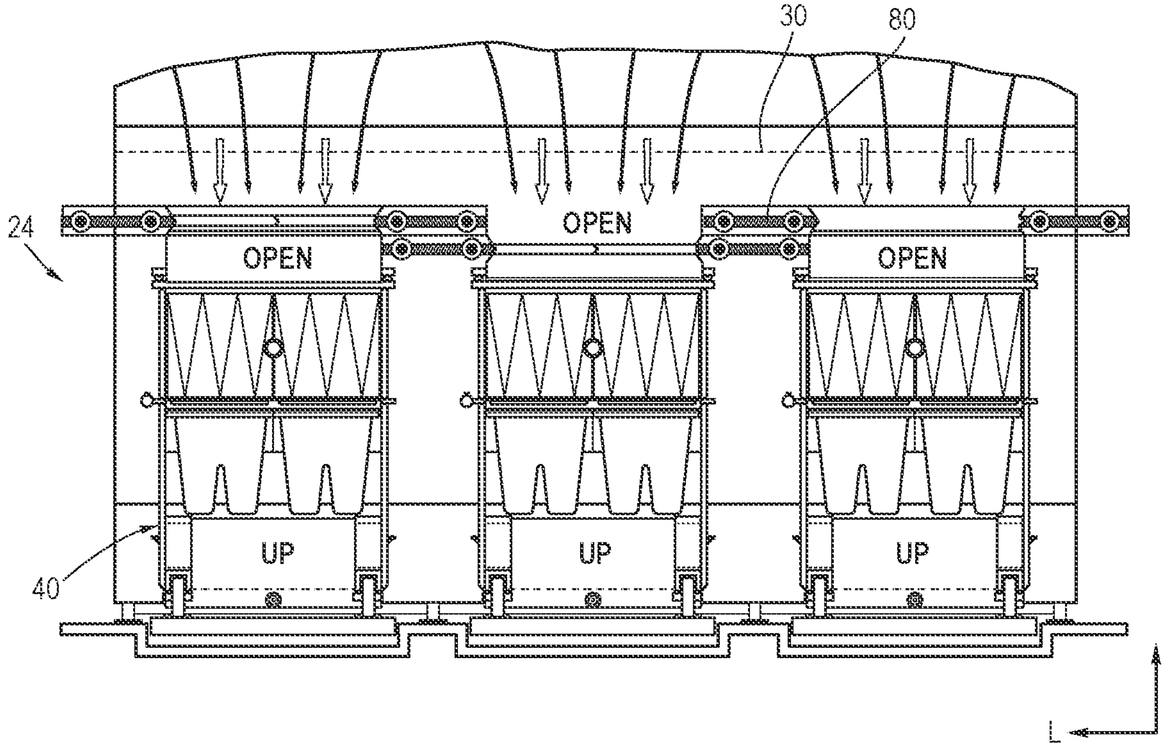
FIG. 13B is a front end view of the filter carts with the inlet duct having the inlet doors in an open position.
Figure 13C:
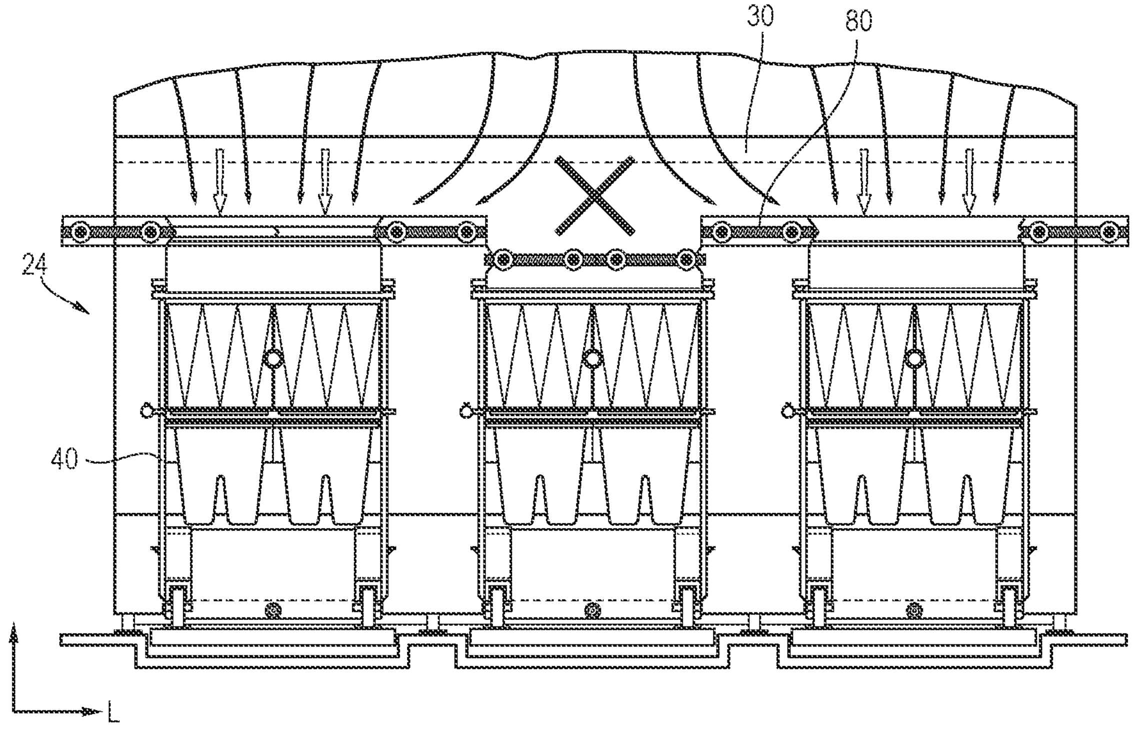
FIG. 13C is the front end view of the filter carts with the inlet duct having the inlet doors in a closed position of FIG. 13B.

FIGS. 13A-13C show the inlet duct 30 having inlet doors 80 in the under section 24 in accordance with another embodiment of the present disclosure. In this exemplary embodiment, three (3) filter carts 40 are located in a side-by-side arrangement in the under section 24 (see FIGS. 13B-13C). In FIG. 3A, one or more inlet sliding doors 80 are coupled with the inlet duct 30 to open or close the inlet duct 30 and one or more dampers 85 are operatively coupled with the exhaust duct 34 to open or close the exhaust duct 34. FIG. 13B shows the presence of three (3) inlet sliding doors 80 which can be moved in a guillotine-like manner along a length of the spray booth 10 (i.e., a longitudinal direction L) to close the air flow passage of the inlet duct 30. Further, as shown in FIGS. 13B and 13C, the inlet doors 80 are each staggered to avoid interfering with each of the inlet sliding doors 80 when they are opened. So, these sliding doors 80 allow the filter cart 40 to be removed and replaced while the paint spray booth 10 is in operation. Under certain circumstances, the use of the sliding doors 80 in the inlet duct 30 and the dampers 85 in the exhaust duct 34 may allow replacement of the filter cart 40 with filters without having to stop the spray booth 10. For example, FIG. 13B shows the inlet doors 80, which are all opened while the spray booth 10 is in operation, but FIG. 13C shows one of the inlet doors 80 (i.e., a middle one), which is closed such that one of the filter carts 40, which is located in the middle location can be removed while the spray booth 10 is in operation. This may allow to continue painting operations while the filters are being replaced, hence eliminating the down time of the spray booth operation.

Figure 14A:
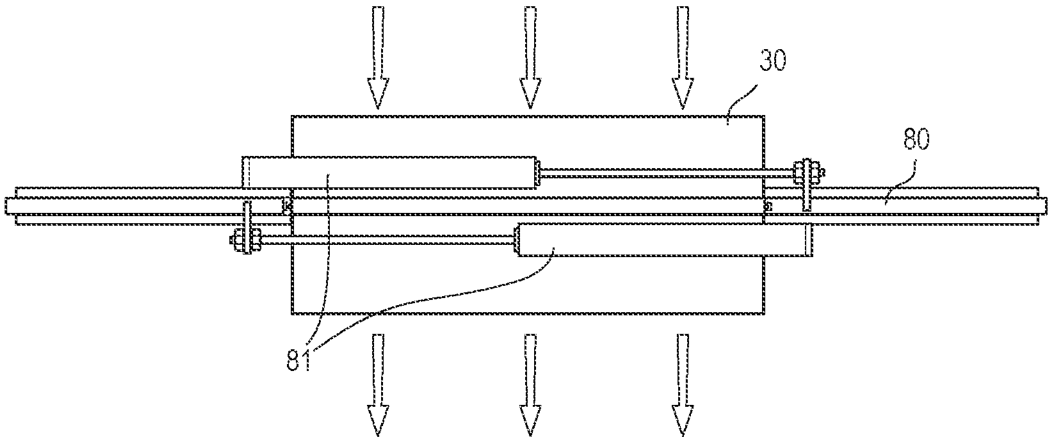
FIG. 14A shows a detailed view of the inlet door having an actuator in the inlet duct of FIG. 13A.
Figure 14B:
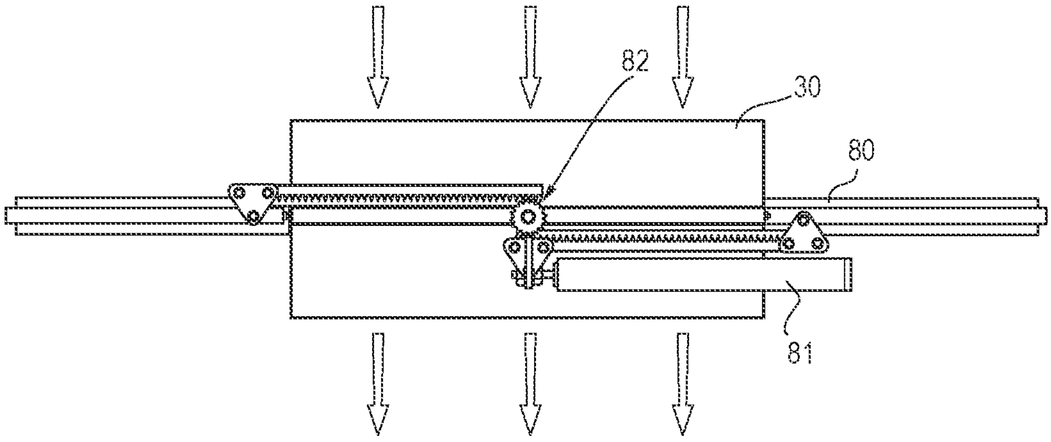
FIG. 14B shows a detailed view of the inlet door having a rack and pinion system in the inlet duct.
Figure 14C:
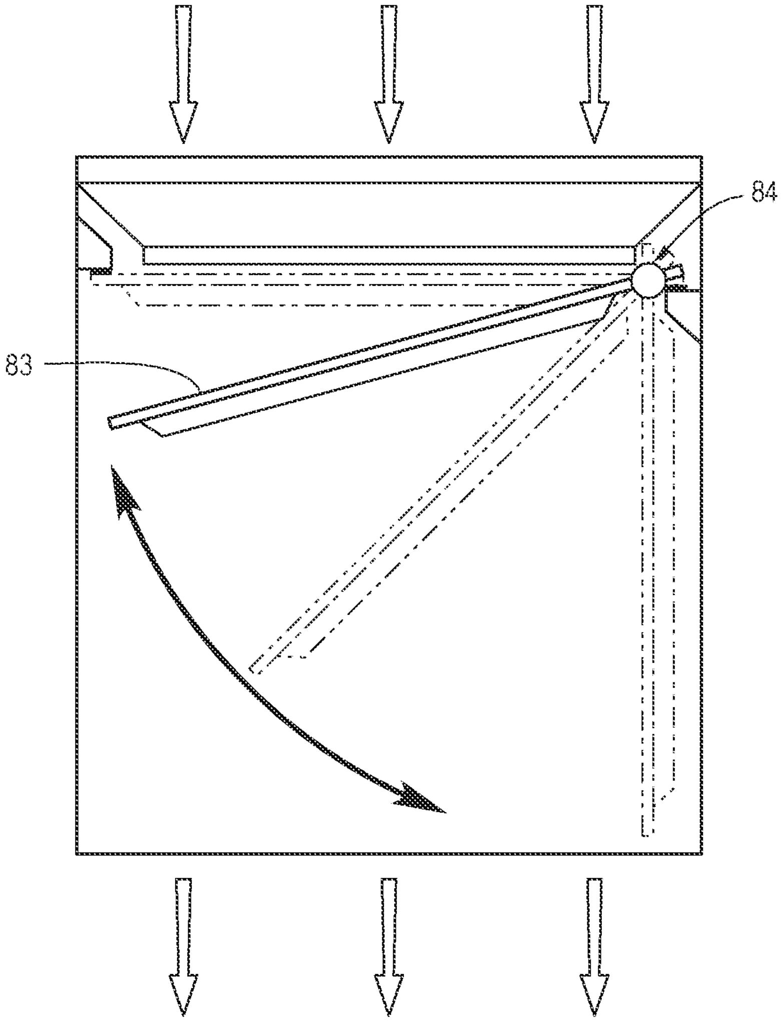
FIG. 14C shows a detailed view of the inlet door having a pivot system in the inlet duct.
Figure 14D:
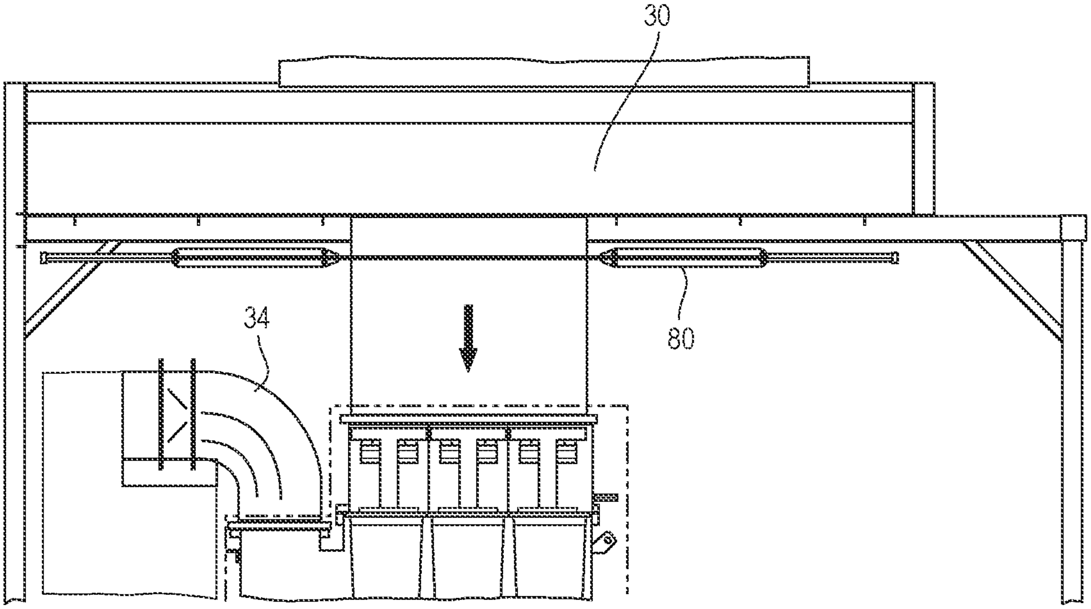
FIG. 14D shows inlet doors arranged in a spray booth.
Figure 14E:
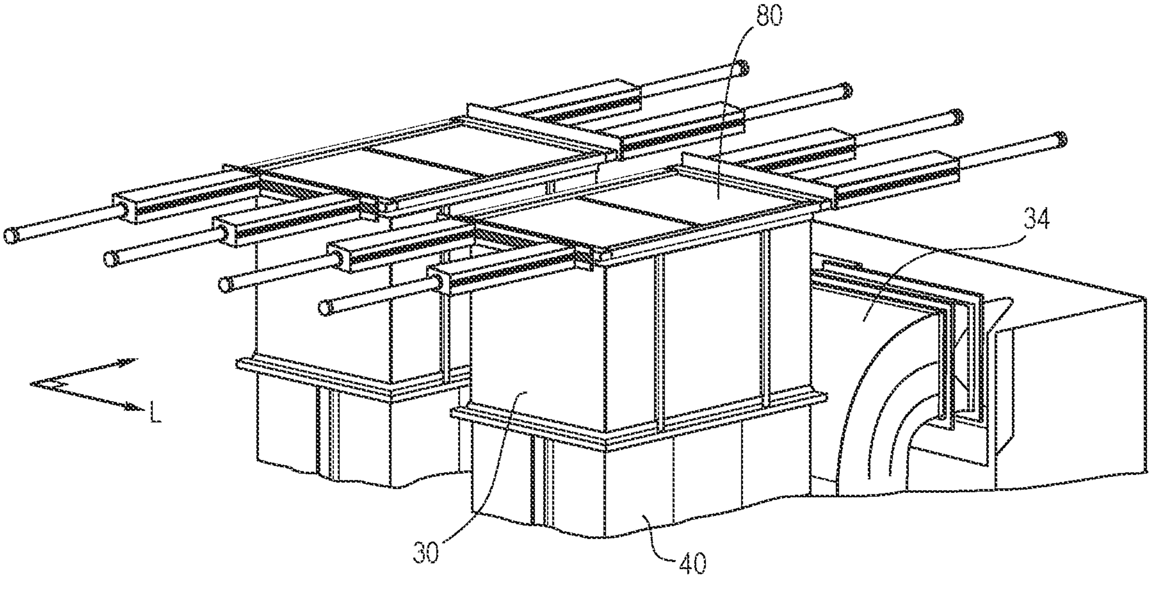
FIG. 14E shows a perspective top view of inlet ducts having inlet doors in under section of FIG. 14D.

FIG. 14A shows a double guillotine sliding door 80, which is also shown in FIGS. 13A-13C. In FIG. 14A, the sliding door 80 has a pair of doors, which are each coupled with each of the guillotine actuators 81 such that each of the actuators 81 controls each door of the sliding door 80. In another approach, a single guillotine sliding door (not shown) having only one side with one actuator may be arranged in the inlet duct 30 to open and close the air passage in the inlet duct 30 instead of the double sliding door shown in FIG. 14A. FIG. 14B shows the guillotine sliding door 80 having a rack and pinion system 82 having one actuator 81 such that one actuator can control (i.e., open and close) the double sliding door 80 having two doors. FIG. 14C shows a pivot door 83 which is rotated to open and close the air passage in the inlet duct 30 relative to a pivot 84 arranged in the inlet duct 30 by one actuator (not shown). FIGS. 14D and 14E show the inlet sliding doors 80, which are arranged perpendicular to the length of the spray booth 10 (i.e., perpendicular to the longitudinal direction L) to close off the air flow passage of the inlet duct 30 such that each of the sliding doors 80 is not staggered to each other.

Figure 15A:
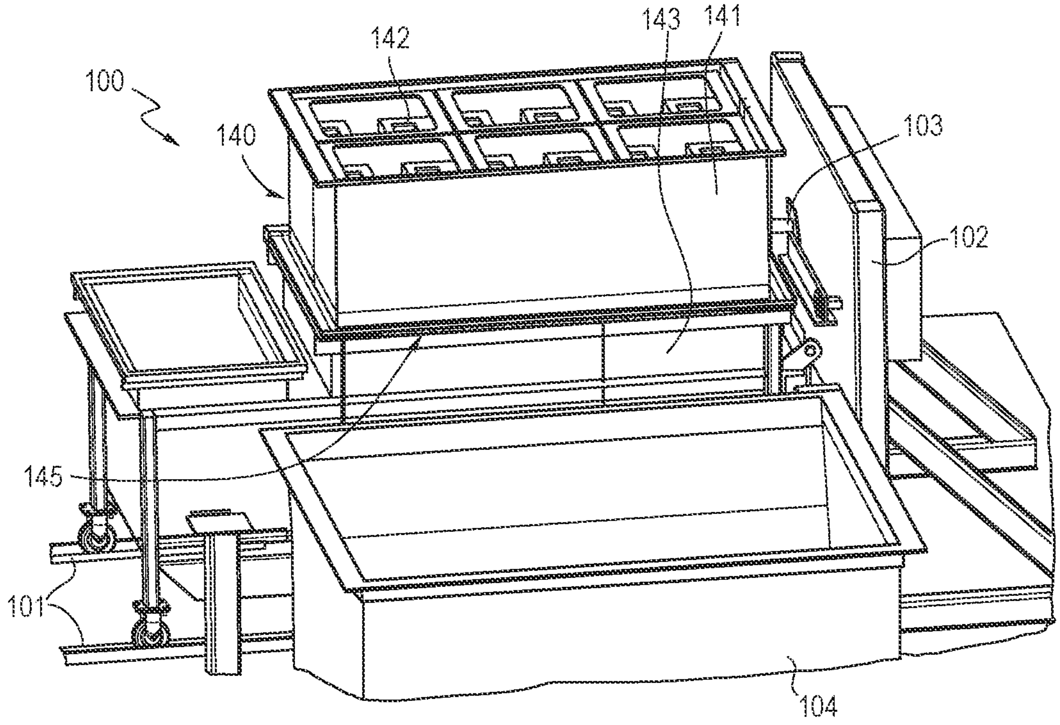
FIG. 15A is a perspective top view of a filter disposal station in accordance with an exemplary embodiment of the present disclosure.
Figure 15B:
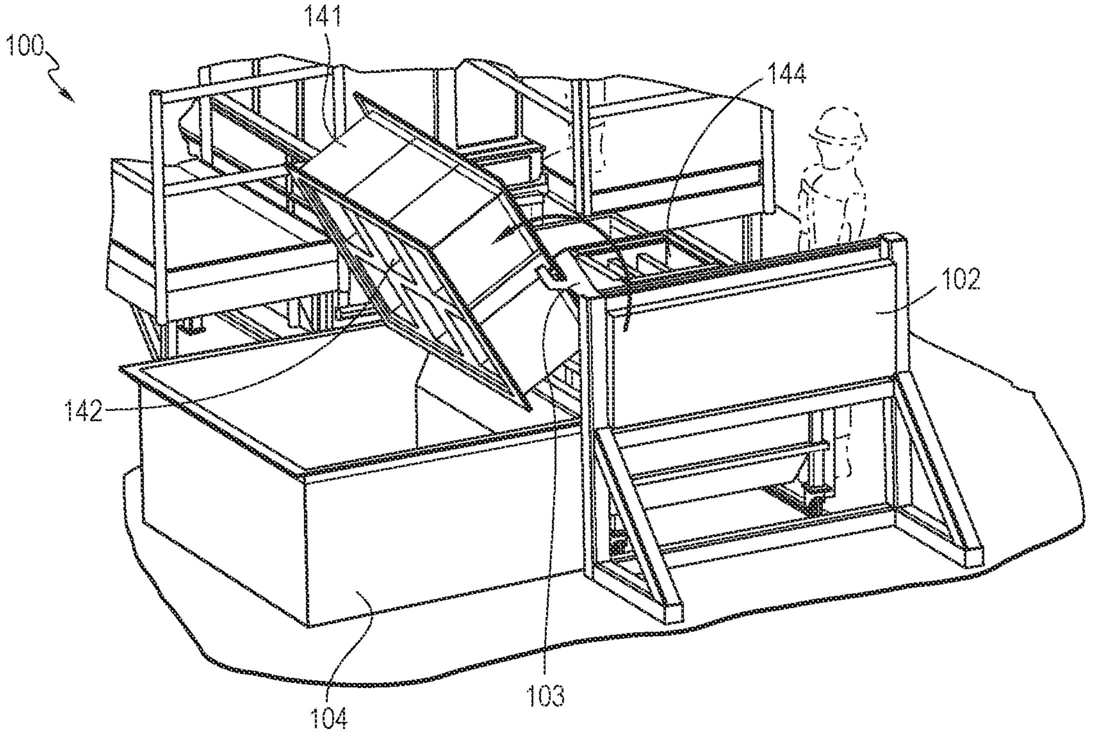
FIG. 15B is another perspective view of the filter disposal station of FIG. 15A, and FIGS. 15C-15D show a detailed view of a locking system for filter disposal of the filter disposal station of FIG. 15A.

FIGS. 15A and 15B show a filter disposal station 100 for replacing loaded filters with new filters in accordance with an embodiment of the present disclosure. As shown in FIGS. 15A and 15B, a loaded filter cart 140 is pushed into the filter disposal station 100 along a pair of rails 101 fixed on the floor of the filter disposal station 100 such that the filter cart 140 is guided into a position for disposal in the filter disposal station 100. In FIGS. 15A and 15B, for example, the filter cart 140 has the filter rack, which includes a first filter cage 141 receiving the first level filter 142 and a second filter cage 143 receiving the second level filter 144, which is located below the first level filter 142. In another approach, the second and third level filters may be disposed in the second filter cage 143 (see FIG. 21). Further, in the filter cart 140, the first filter cage 141 and the second filter cage 143 are connected to each other by a hinge mechanism 145 such that the first filter cage 141 is rotatably opened along the hinge mechanism 145 (see FIG. 15B).

Figure 15C:
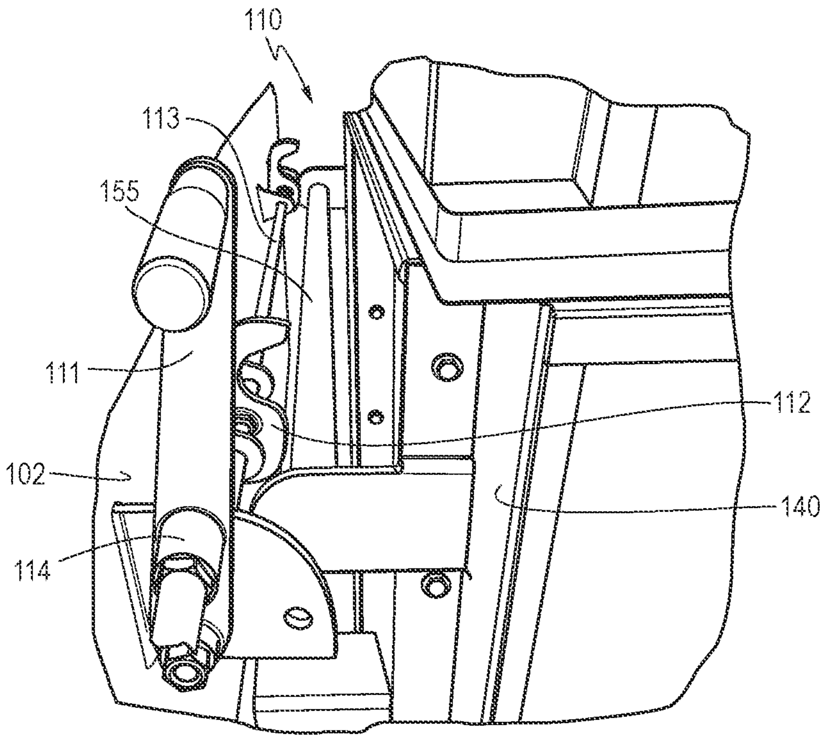
Figure 15D:
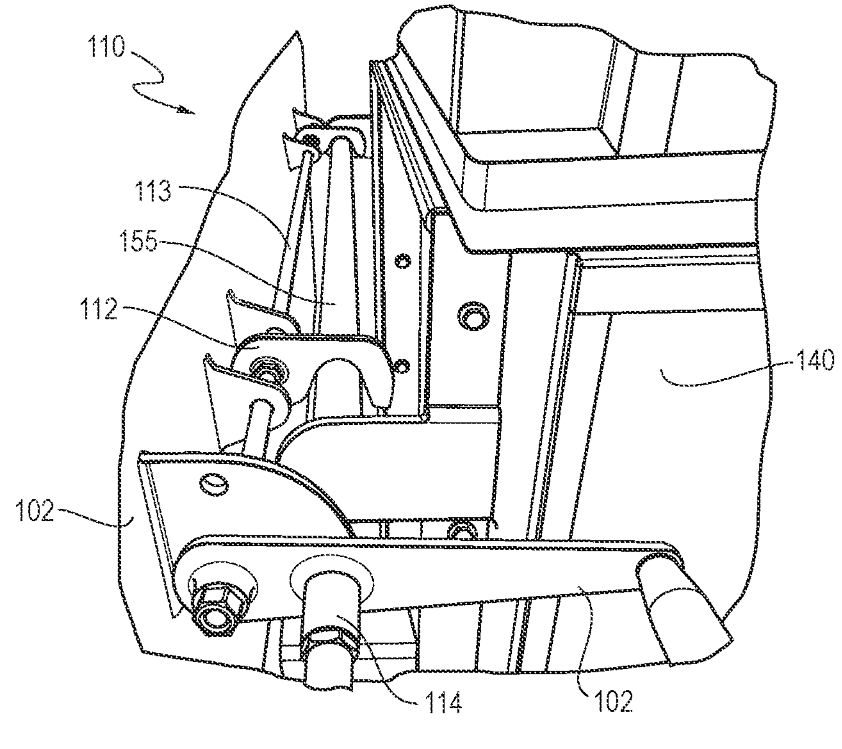

As shown in FIG. 15B, the filter disposal station 100 includes a disposal device 102 actuating an automatic disposal arm 103 to rotate the first filter cage 141 with respect to the axis of the hinge mechanism 145 of the filter cart 140. In another approach, the disposal device 102 includes a manual locking system 110 having a rotating handle 111 with one or more hooks 112, which are fixedly attached to a handle bar 113. Further, the rotating handle 111 includes a locking pin 114, which can be engaged with holes formed in the disposal device 102 in a disengaged position and an engaged position of the rotating handle 111. As shown in FIGS. 15C and 15D, when the filter cart 140 having a cart handle 155 is pushed into the filter disposal station 100, the hooks 112 are rotated by the rotating handle 111 and securely engaged with the cart handle 155 with the locking pin 114 such that the filter cart 140 is locked in a disposal operating position. FIG. 15A shows a disengaged position of the locking system 110 and FIG. 15B shows an engaged position of the locking system 110. In addition, the locking system 110 securely engaged with the filter cart 140 can prevent the filter cart 140 from tipping when the first filter cage having the loaded first level filter is rotated to throw away the dirty filters. Further, the filter disposal station 100 includes one or more dumpsters 104 to receive the loaded filters for disposal when the loaded filters are replaced with the new filters. In FIG. 15B, the first filter cage 141 is rotated toward one of the dumpsters 104 and the loaded first level filters 142 are dropped (i.e., fallen) by the gravity force or a push mechanism (not shown). Further, the second level filters 144 are also removed manually by disposal operators or a lifting-up disposal mechanism (see FIG. 23B). Preferably the first filter cage is configured to rotate through a range greater than 90 degrees, and preferably up to 180 degrees of rotation, so that the filters 142 are oriented to face at least partially downwards to facilitate removal under gravity or with gravity assistance.

Figure 16A:
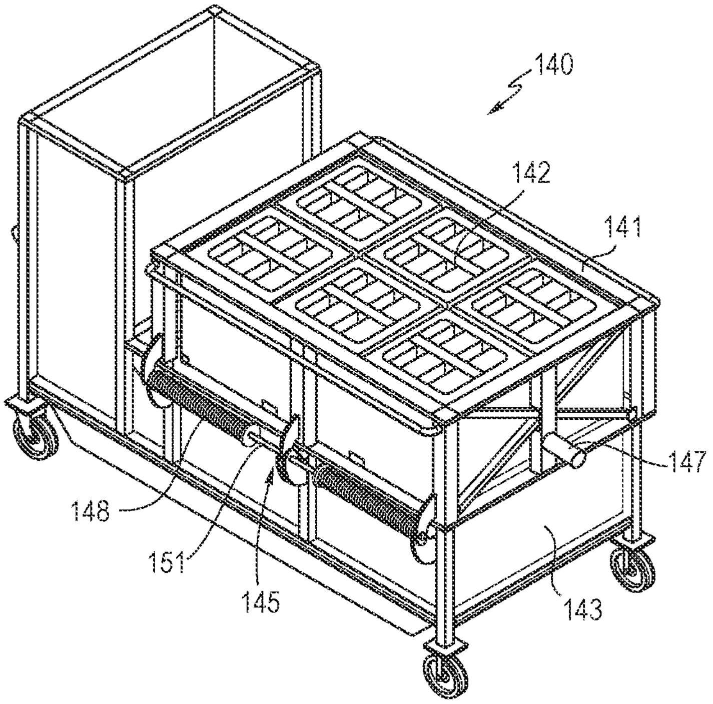
FIG. 16A is a perspective top view of a filter cart with filter cages in accordance with an exemplary embodiment of the present disclosure.
Figure 16B:
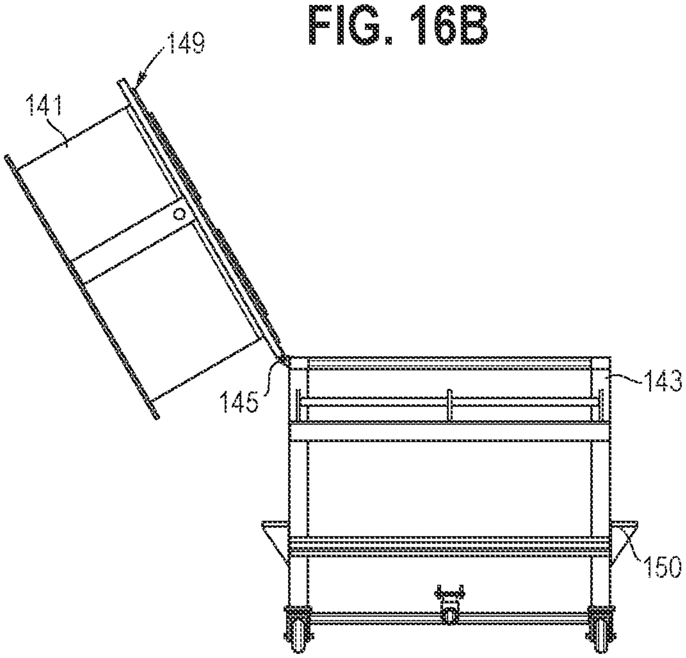
FIG. 16B is a side view of the filter cart with an open position of the filter cage of FIG. 16A.

FIG. 16A shows the filter cart 140 including an actuator handle 147 fixedly attached to the first filter cage 141, and releasably coupled with the disposal arm 103 of the disposal device 102 when the first filter cage 141 is rotated to remove the first level filters 142 in the filter disposal station 100 (see FIG. 15B). Further, in FIG. 16B, the filter cart 140 includes a gasket seal 149 to provide seal between the first filter cage 141 and the second filter cage 142. As shown in FIG. 16B, the gasket seal 149 securely attached around the perimeter of the bottom of the first filter cage to make contact with the top surface formed around the perimeter of the second filter cage 143. In another approach, the gasket seal 149 may be attached around the perimeter of the top surface of the second filter cage (not shown). Also, in FIG. 16B, the filter cart 140 includes an anti-tipping support 150 configured to prevent the filter cart 140 from tipping over when the first filter cage 141 with the loaded first level filters 142 is rotated to remove the first level filter 142 in the filter disposal station 100. As shown in FIGS. 16A and 16B, the first filter cage 141 and the second filter cage 143 are closed, which is defined as a closed position of the first filter cage 141 (see FIG. 16A) and the first filter cage 141 is rotated with an angle relative to the second filter cage 143 which is defined as an open position of the first filter cage 141 (see FIG. 16B).

Referring back to FIG. 16A, the hinge mechanism 145 of the filter cart 140 is formed with at least one torsion spring 148 and an axial bar 151, which is like that used in a garage door system. In another approach, the hinge mechanism 145 can be formed with a torsion bar, which is like that used in the vehicle suspension. Accordingly, the hinge mechanism 145 used in the filter cart 140 facilitates manual rotation and/or assisted rotation with the disposal device 102 of the filter disposal station 100 such that the hinge mechanism 145 partially or fully counteracts the weight of the first filter cage 141 and the loaded first level filter 142 presented in the first filter cage 141, and reduces the external force required to rotate the first filter cage 141 with the loaded first level filter 142. So, the first filter cage 141 of the filter cart 140 formed with the hinge mechanism 145 can be rotated by an angle up to 180 degrees to facilitate the filter removal.

Figure 17A:
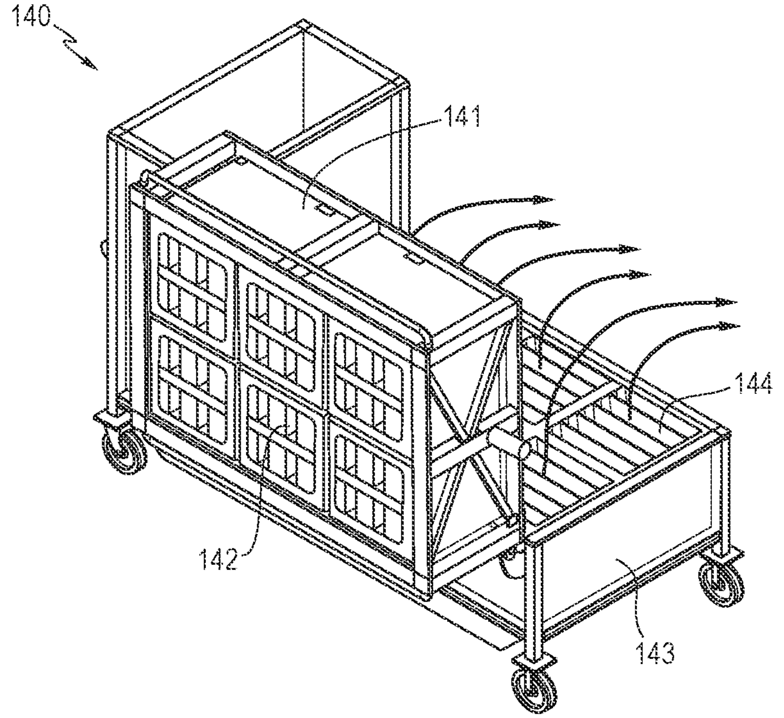
FIG. 17A is a perspective top view of the filter cage with an open position of the filter cage of FIG. 16A.
Figure 17B:
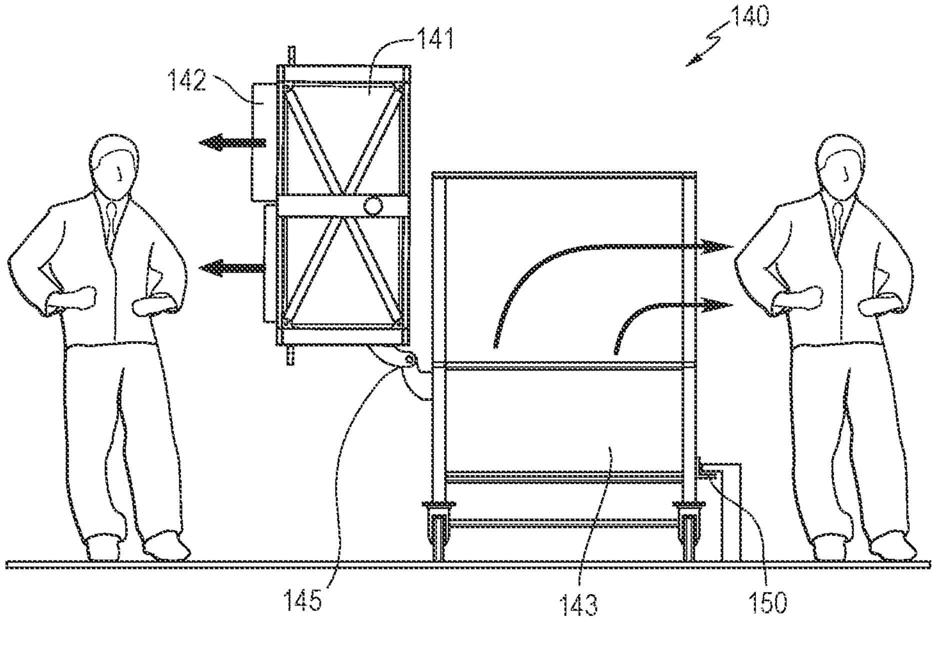
FIG. 17B is a front view of the filter cart of FIG. 17A.
Figure 18A:
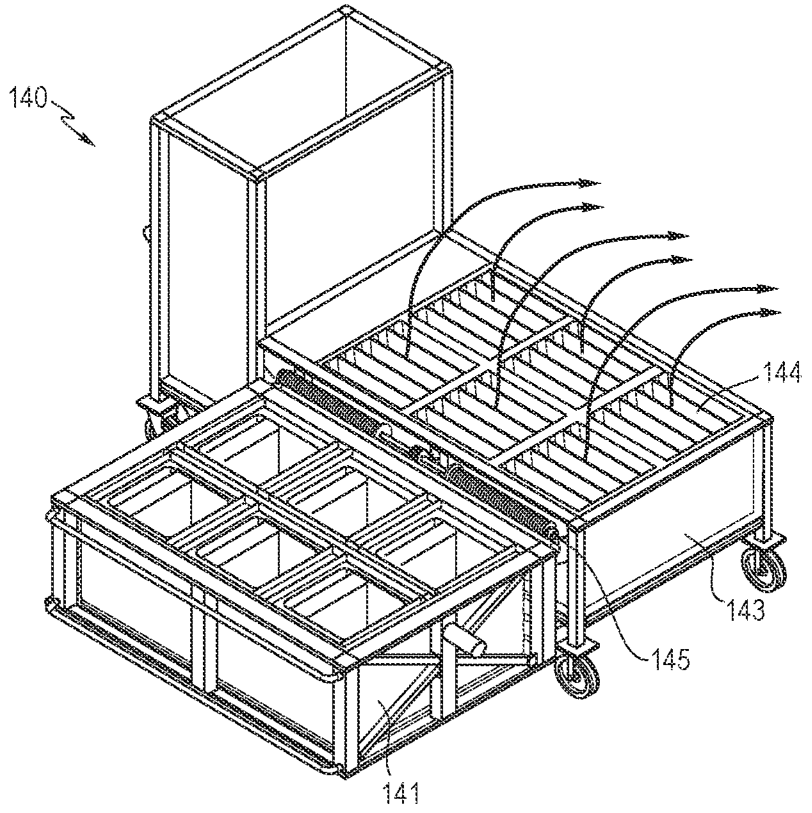
FIG. 18A is a perspective top view of the filter cage with another open position of the filter cage of FIG. 17A.
Figure 18B:
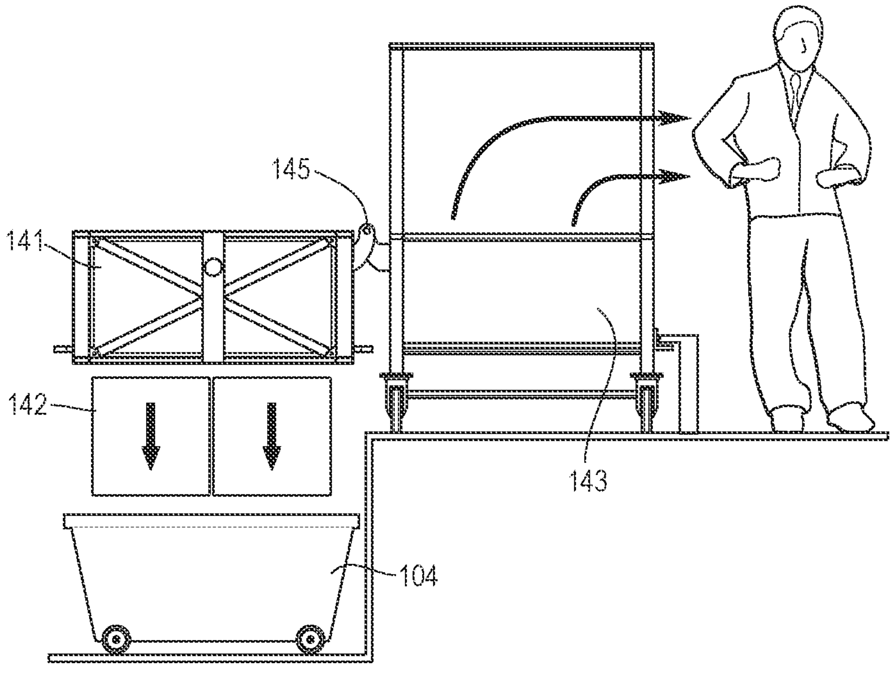
FIG. 18B is a front view of the filter cart of FIG. 18A.

For example, FIGS. 17A and 17B show the filter cart 140 having the first filter cage 141, which is rotated by 90 degrees with respect to the axis of the hinge mechanism 145. When the first filter cage 141 is rotated by substantially 90 degrees, the loaded first level filter 142 can be removed manually by a disposal operator and the loaded second level filter 144 (or the second and third level filters) can be removed manually by another disposal operator in the filter disposal station 100 (see FIG. 17B). FIGS. 18A and 18B show the filter cart 140 having the first filter cage 141, which is rotated by 180 degrees with respect to the axis of the hinge mechanism 145. When the first filter cage 141 is rotated by substantially 180 degrees, the loaded first level filter 142 can be fallen by the gravity force (i.e., by weight of the loaded first level filter) and the loaded second level filter 144 (or the second and third level filter) can be removed manually by the disposal operator in the filter disposal station 100 (see FIG. 18B). In another approach, the first and second level filters 142 and 144 can be removed by automatic machine devices (see FIGS. 23B and 24B).

Figure 19:
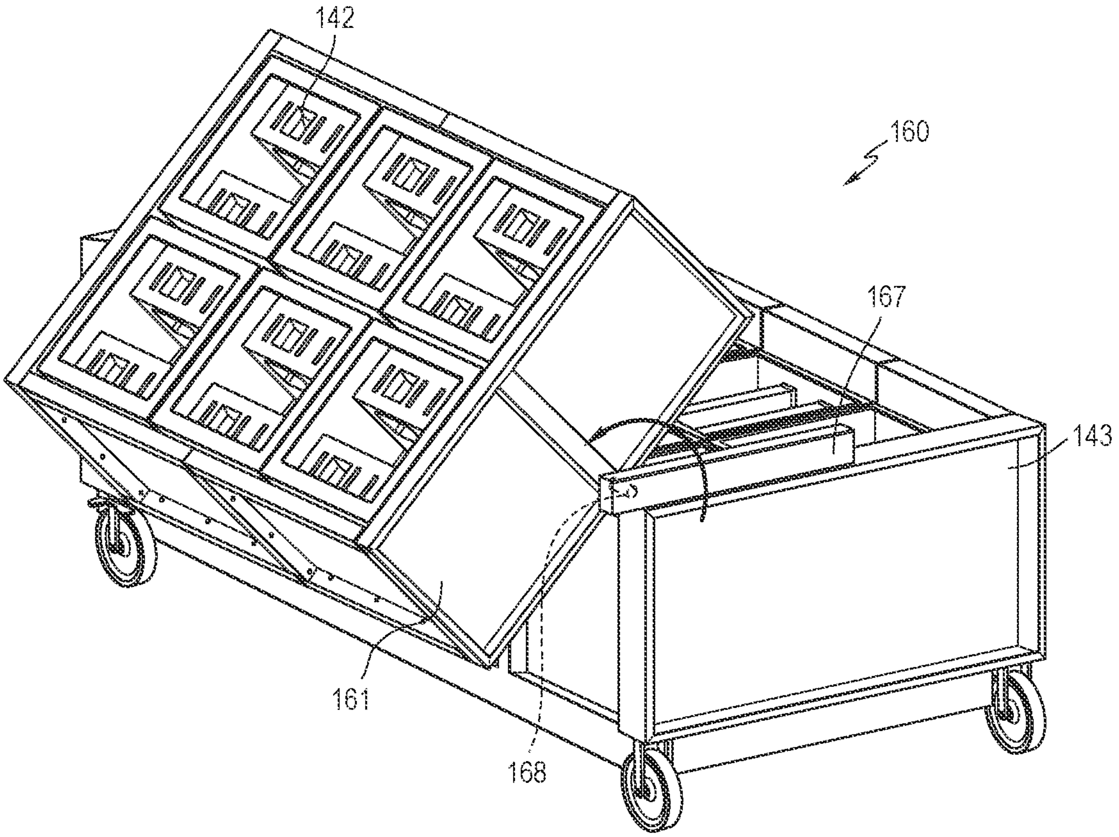
FIG. 19 is a perspective top view of a filter cart having filter cages in accordance with an exemplary embodiment of the present disclosure.

FIG. 19 shows another embodiment of the filter cart 160, which is similar to the embodiment of the filer cart 140 of FIG. 16 with exception of a first filter cage 161 having a sliding-out and rotating system. The sliding-out and rotating system includes a pair of rails 167 attached to the top surface of the second filter cage 143 for sliding out the first filter cage 161 in a half way along the pair of rails 167, and also a pair of pivot members 168 arranged in an end of each rail 170 for rotating the first filter cage 161. In the sliding-out and rotating system, as shown in FIG. 19, the first filter cage 161 can be rotated by an angle up to 90 degrees. In another approach, the first filter cage can be also rotated by larger angles (i.e., over 90 degrees) if the first filter cage is slid out fully from the rails (not shown). Further, the sliding-out and rotating system in this embodiment reduces external force required to rotate the first filter cage 161 with the loaded first level filter 142 when the loaded filters are replaced in the filter disposal station.

Figure 20A:
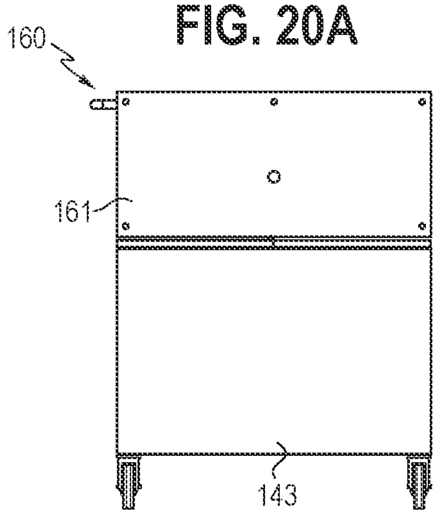
FIGS. 20A-20D show an opening process of the filter cage of the filter cart of FIG. 19.
Figure 20B:
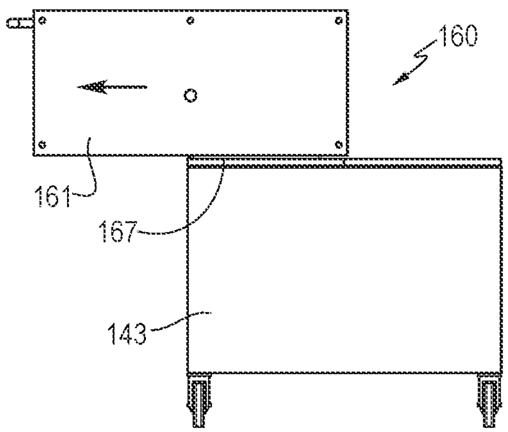
Figure 20C:
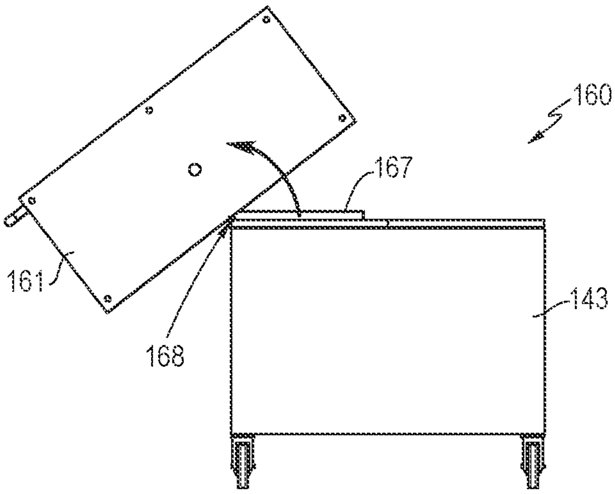
Figure 20D:
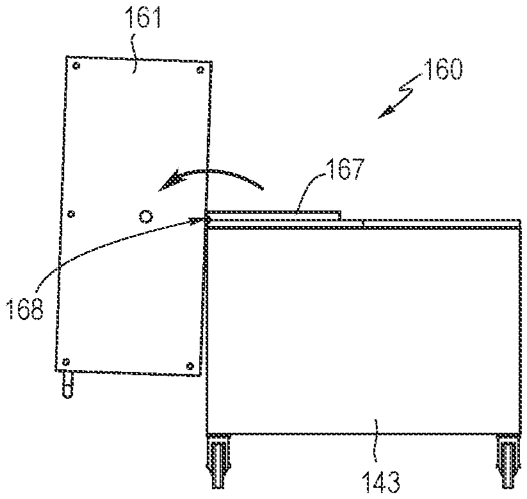
Figure 21:
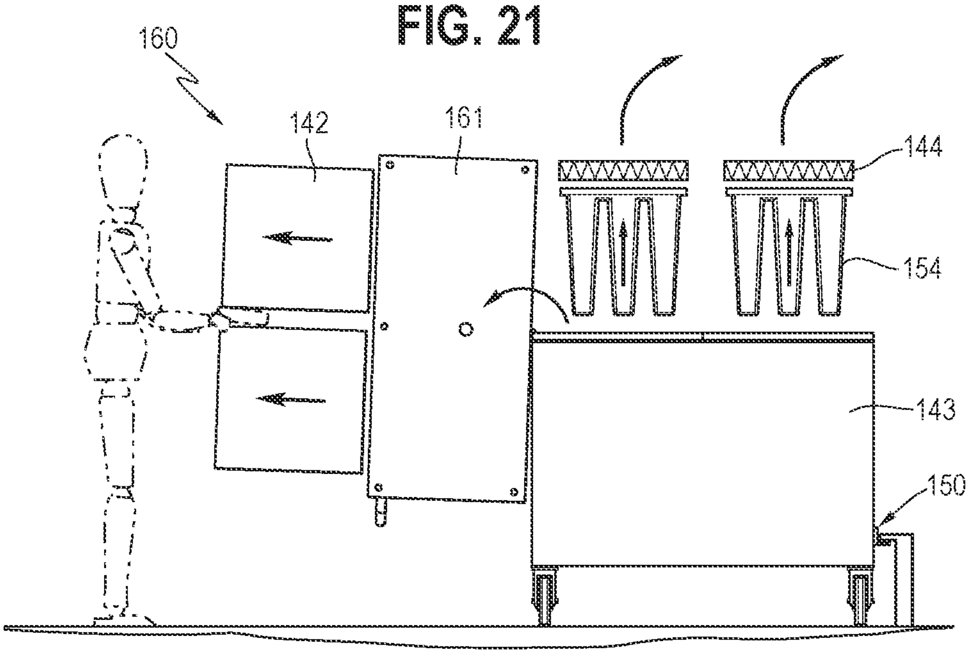
FIG. 21 shows an open position of the filter cage of the filter cart of FIG. 19.

FIGS. 20A-20D show the disposal steps of the sliding-out and rotating system of the filter cart 160. FIG. 20A shows the filter cart 160 having the sliding-out and rotating system for removing the loaded first and second level filters 142 and 144. FIG. 20B shows the first filter cage 161 slidably moved out in a half way relative to the second filter cage 143 along the rails 167 (see also FIG. 19) arranged transversely in the moving direction of the filter cart 160. FIG. 20C shows the first filter cage 161, which is rotated by an angle with respect to the pivot device 168. Since the pivot device 168 of the first filter cage 141 is located near the center of gravity of the first filter cage 161 (at least horizontally), the rotational movement of the first filter cage 161 becomes balanced around a pivot point of the rails 167. Further, FIG. 20D shows the first filter cage 161, which is rotated by substantially 90 degrees to facilitate the filter removal. FIG. 21 shows the filter cart 160 having the first filter cage 161 rotated by substantially 90 degrees. FIG. 21 shows the filter cart 160 having the sliding-out and rotating system and also having the first level filters 142, the second level filters 144, and the third level filters 154. Further, the first filter cage 141 is rotated by substantially 90 degrees such that the loaded first level filters 142 are removed manually by the operator and also the loaded second and third level filters 144 and 154 are also removed manually by other operators (see FIG. 24A). In another approach, the first, second, and third level filters 142, 144, and 154 can be removed by automatic disposal machine device (see FIG. 24B).

Figure 22A:
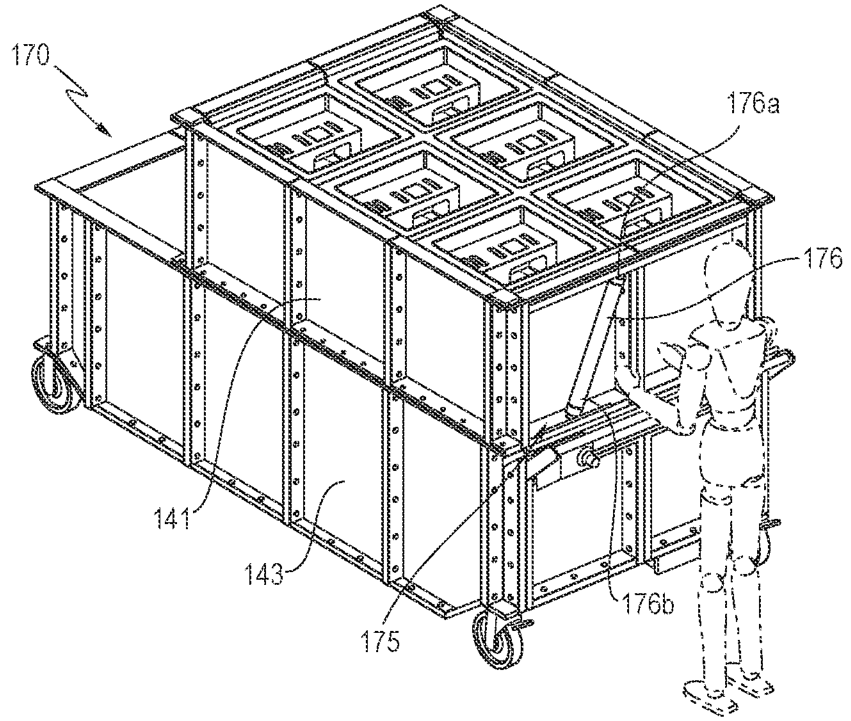
FIG. 22A is a perspective top view of a filter cart having filter cage in accordance with an exemplary embodiment of the present disclosure.
Figure 22B:
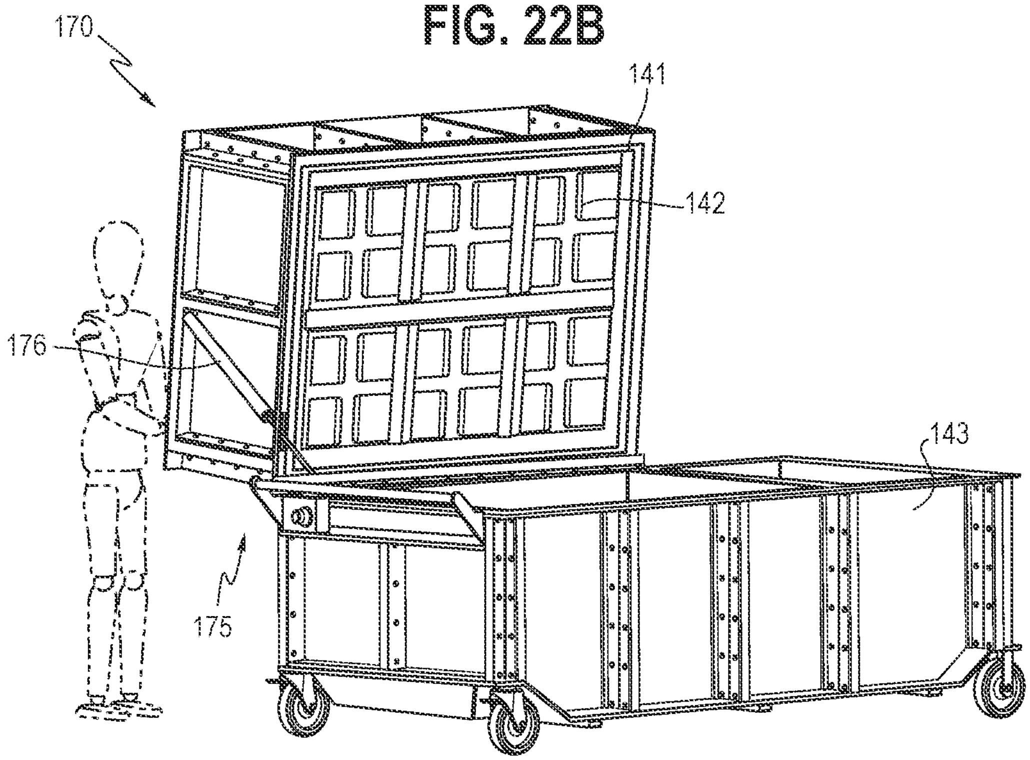
FIG. 22B shows an opened position of the filter cage of the filter cart of FIG. 22A.

FIGS. 22A and 22B show another embodiment of the filter cart 170, which is similar to the embodiment of the filer cart 140 of FIG. 16 with exception of a first filter cage 141 having an actuator control system 175 for the rotational movement of the first filter cage 141. The actuator control system 175 includes a pair of actuators 176 having a first end 176*a* connected to the first filter cage 141 and a second end 176*b* connected to the second filter cage 143. The first filter cage 141 is rotated by an angle up to 90 degrees by the actuator control system 175. In FIG. 22B, for example, the first filter cage 141 is rotated by substantially 90 degrees such that the first level filters 142 can be removed manually by an operator. Further, the second level filters 144 are also removed manually by the other operators. In the filter cart 170, the actuator control system 175 having the actuator 176 reduces external force required to rotate the first filter cage 141 with the loaded first level filter 142 when the loaded filters need to be replaced in the filter disposal station 100.

Figure 23A:
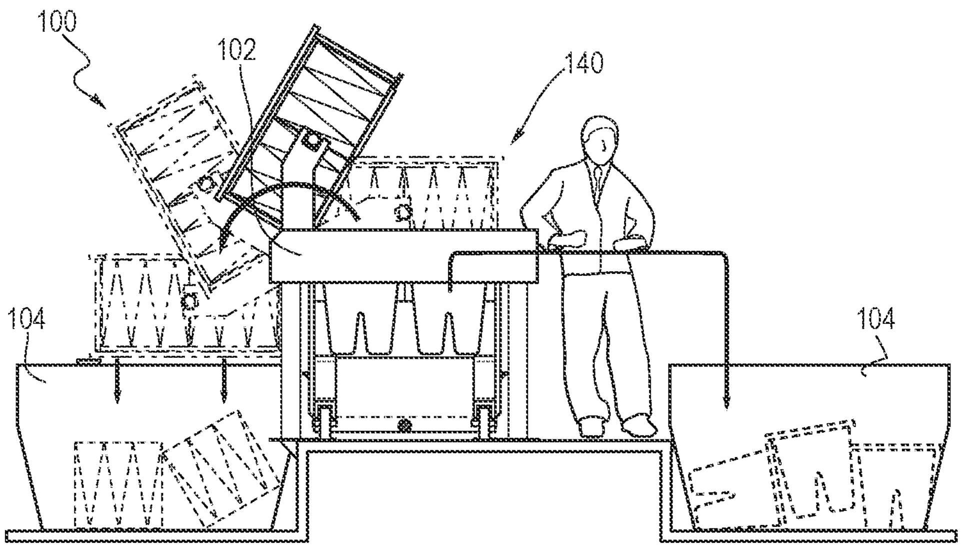
FIG. 23A shows a filter disposal station having semi-automatic disposal system with a two-level filter cart.
Figure 23B:
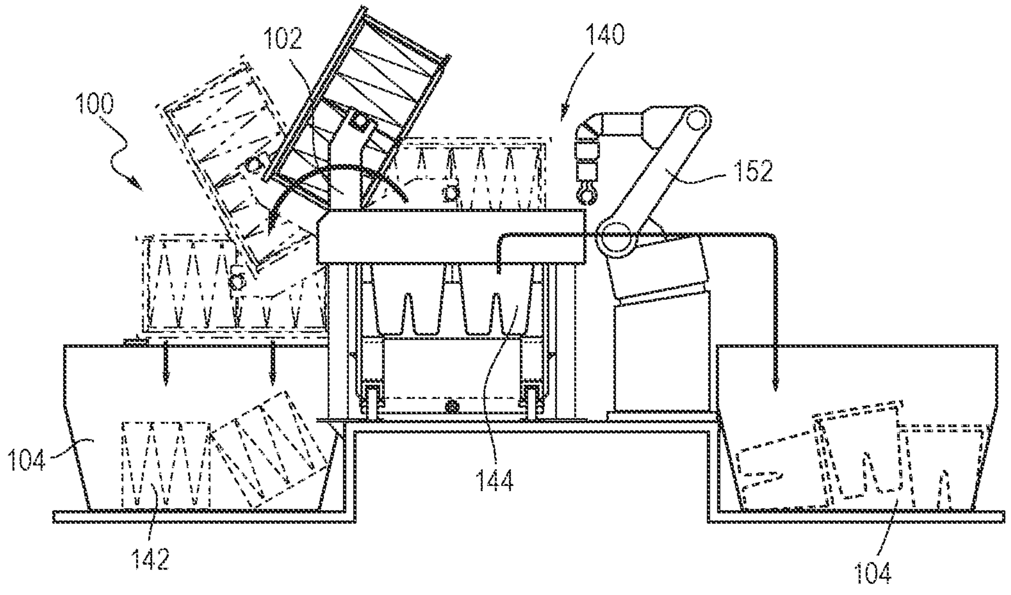
FIG. 23B shows a filter disposal station having an automatic disposal system with the two-level filter cart.
Figure 24A:
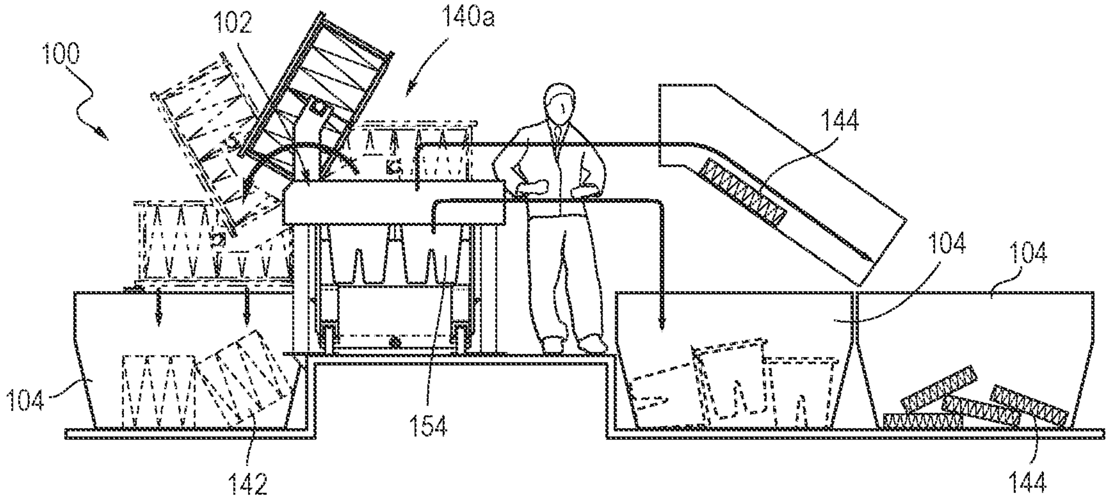
FIG. 24A shows a filter disposal station having semi-automatic disposal system with a three-level filter cart.
Figure 24B:
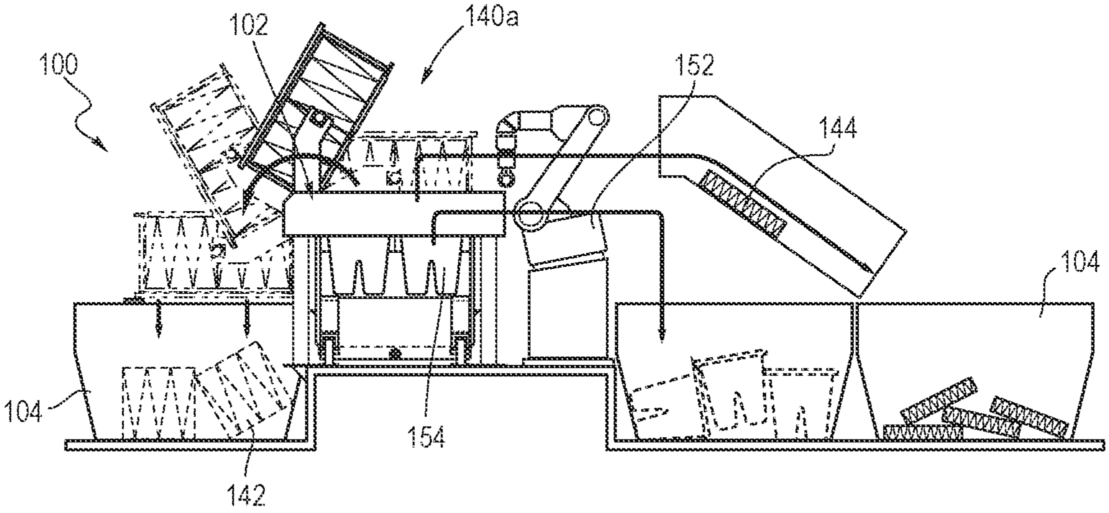
FIG. 24B shows a filter disposal station having an automatic disposal system with the three-level filter cart.

FIGS. 23A and 23B show the filter cart 140 having the first level filter 142 and the second level filter 144 for the filter disposal in the filter disposal station 100. As shown in FIG. 23A, the first filter cage 141 is rotated by substantially 180 degrees by the disposal device 102 and the first level filter 142 is removed by gravity force, and the second level filter 144 is removed manually by an operator. In another approach, as shown in FIG. 23B, the second level filter 144 can be removed automatically by a lifting-up disposal mechanism 152 in the filter disposal station 100. FIGS. 24A and 24B show the filter cart 140*a* having the first level filter 142, the second level filter 144, and the third level filter 151 for the filter disposal in the filter disposal station 100. As shown in FIG. 24A, the first filter cage 141 is rotated by substantially 180 degrees by the disposal device 102 and the first level filter 142 is removed by gravity force, and the second level filter 144 and the third level filter 154 are each removed manually by an operator. In another approach, as shown in FIG. 24B, each of the second level filter 144 and the third level filter 154 can be removed automatically by the lifting-up disposal mechanism 152 in the filter disposal station 100.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A filter system adapted for use with a paint spray booth having an inlet duct for conducting a flow of contaminated air and an exhaust duct for conducting a flow of filtered air, the filter system comprising:

at least one movable cart formed with a housing having one or more surfaces for providing a housing inlet and a housing outlet;

at least one filter media element arranged within the housing, the at least one filter media element positioned between the housing inlet and the housing outlet;

an inlet hood securely attached around a bottom of the inlet duct, the inlet hood extending from the inlet duct in a vertical direction and an outlet hood securely attached around a bottom of the exhaust duct, the outlet hood extending from the exhaust duct in a vertical direction; and at least one seal provided around a perimeter of each of the inlet hood and the outlet hood, wherein the at least one movable cart is configured to move for making contact with the at least one seal between the housing inlet and the inlet hood, and also between the housing outlet and the outlet hood, wherein each of the inlet hood and the outlet hood includes a bottom surface angled to make contact with the at least one movable cart when the movable cart is pushed into a loaded position.

2. The filter system of claim 1, wherein each of the inlet hood and the outlet hood includes an inlet gasket and an outlet gasket fixedly attached along the angled bottom surface of each of the inlet hood and the outlet hood.

3. The filter system of claim 2, wherein the at least one movable cart includes an inlet wing fixedly attached around a perimeter of the housing inlet with an angle corresponding to the angled bottom surface of the inlet hood and an outlet wing fixedly attached around a perimeter of the housing outlet with an angle corresponding to the angled bottom surface of the outlet hood.

4. The filter system of claim 3, wherein, when the at least one movable cart having the inlet and outlet wings is moved into a loaded position in an under section, the inlet angled wing contacts the inlet angled hood and the outlet angled wing contacts the outlet angled hood such that each of the inlet and outlet gaskets contacts a top surface of each of the inlet angled wing and the outlet angled wing.

5. The filter system of claim 4, comprising one or more clamps fixedly attached to the inlet hood or the outlet hood to operatively engage with the at least one movable cart to provide seal in an operating position.

6. The filter system of claim 1, wherein the at least one movable cart includes at least one horizontal wheel rotatably coupled to a bottom of the movable cart to be guided in a central rail fixedly disposed on a floor in an under section when the at least one movable cart is pushed into the under section.

7. The filter system of claim 1, wherein each of the inlet ducts formed in the paint spray booth includes a door used to close and open each of the inlet ducts such that at least one movable cart is replaced during the operation of the paint spray booth.

8. The filter system of claim 7, wherein the door is slidably moved to close and open the inlet duct by an actuator or a rack and pinion mechanism.

9. The filter system of claim 7, wherein the door is pivotably moved to close and open the inlet duct by a pivot mechanism.

* * * * *